(12) United States Patent
Makita

(10) Patent No.: US 8,441,440 B2
(45) Date of Patent: May 14, 2013

(54) POSITION INFORMATION DETECTION DEVICE, POSITION INFORMATION DETECTION METHOD, AND POSITION INFORMATION DETECTION PROGRAM

(75) Inventor: Norikazu Makita, Tokyo (JP)

(73) Assignee: Tamura Corporation, Tokyo (JP)

( * ) Notice: Subject to any disclaimer, the term of this patent is extended or adjusted under 35 U.S.C. 154(b) by 748 days.

(21) Appl. No.: 12/067,760

(22) PCT Filed: Sep. 26, 2006

(86) PCT No.: PCT/JP2006/319056
§ 371 (c)(1),
(2), (4) Date: Apr. 20, 2010

(87) PCT Pub. No.: WO2007/037227
PCT Pub. Date: Apr. 5, 2007

(65) Prior Publication Data
US 2010/0253622 A1    Oct. 7, 2010

(30) Foreign Application Priority Data

Sep. 27, 2005  (JP) .................................. 2005-279173
Jul. 14, 2006  (JP) .................................. 2006-194920

(51) Int. Cl.
*G06F 3/033*    (2006.01)
(52) U.S. Cl.
USPC ............................... 345/157; 345/156; 463/37
(58) Field of Classification Search .......... 345/157–167; 463/30, 32, 33, 2, 31, 37, 51
See application file for complete search history.

(56) References Cited

U.S. PATENT DOCUMENTS

| 5,502,459 | A | * | 3/1996 | Marshall et al. | ............... 345/158 |
| 6,110,039 | A | * | 8/2000 | Oh | ..................................... 463/2 |
| 7,102,616 | B1 | * | 9/2006 | Sleator | ........................... 345/158 |

(Continued)

FOREIGN PATENT DOCUMENTS

| EP | 0 728 503 | 8/1996 |
| JP | 07-098214 | 4/1995 |

(Continued)

OTHER PUBLICATIONS

Japanese Application No. 2007-537621 Office Action dated Sep. 13, 2011, 4 pages including English translation.
European Application No. 0681058.6-2224/1936477 Extended European Search Report, dated Oct. 20, 2010, 7 pages.

*Primary Examiner* — Dmitriy Bolotin

(57) ABSTRACT

A position information detection device, method, and program are provided, which are capable of detecting position information with high precision using simple and easily identified discrimination marks. A position information detection device has an image capture portion 203 which captures images of discrimination marks 102 arranged on a display 103, via a camera lens; a discrimination mark extraction portion 206 which extracts geometric figures from images captured by the image capture portion 203; a reference rectangle extraction portion 207 which extracts a reference rectangle image formed by connecting specific points in the geometric figures; a focal length calculation portion 213 which, based on a coordinate system specified by the reference rectangle image, calculates the focal length of the camera lens of the image capture portion 203 relative to the image display region of the display 103; and an indicated position calculation portion 210 which, based on the coordinate system and the focal length, calculates the indicated position of the image capture portion 203 relative to the image display region.

21 Claims, 23 Drawing Sheets

U.S. PATENT DOCUMENTS

| | | | |
|---|---|---|---|
| 7,864,159 B2 * | 1/2011 | Sweetser et al. | 345/158 |
| 2002/0107069 A1 * | 8/2002 | Ishino | 463/30 |
| 2003/0199324 A1 * | 10/2003 | Wang | 463/51 |
| 2004/0095317 A1 * | 5/2004 | Zhang et al. | 345/158 |
| 2004/0266528 A1 * | 12/2004 | Wang | 463/37 |
| 2006/0152487 A1 * | 7/2006 | Grunnet-Jepsen et al. | 345/158 |
| 2006/0152488 A1 * | 7/2006 | Salsman et al. | 345/158 |
| 2006/0152489 A1 * | 7/2006 | Sweetser et al. | 345/158 |
| 2006/0284841 A1 * | 12/2006 | Hong et al. | 345/157 |
| 2007/0040800 A1 * | 2/2007 | Forlines et al. | 345/158 |
| 2009/0033623 A1 * | 2/2009 | Lin | 345/158 |

FOREIGN PATENT DOCUMENTS

| | | |
|---|---|---|
| JP | 08071252 | 3/1996 |
| JP | 11305935 | 11/1999 |
| JP | 2003058317 | 2/2003 |
| JP | 3422383 | 6/2003 |
| JP | 2004-139155 | 5/2004 |
| JP | 2005165700 | 6/2005 |

* cited by examiner

*FIG.3*
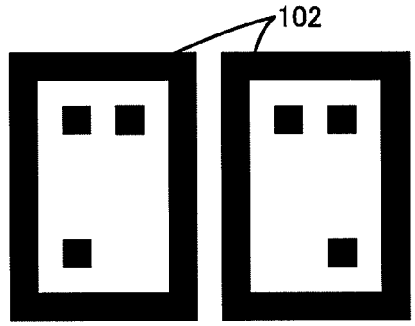
(a)
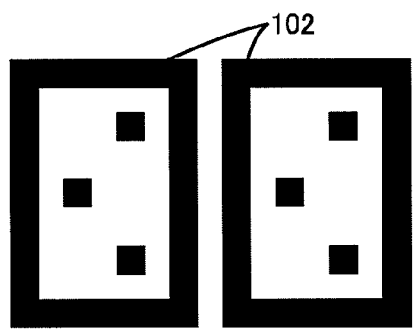
(b)
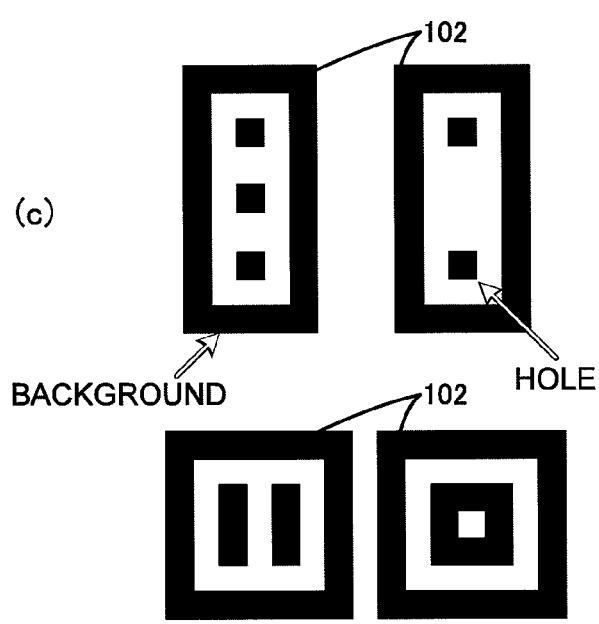
(c)
BACKGROUND   HOLE
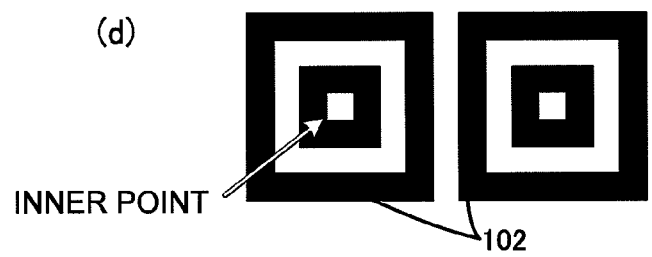
(d)
INNER POINT FIG.4
(a) 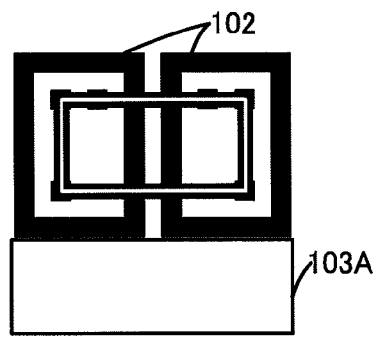
(b) 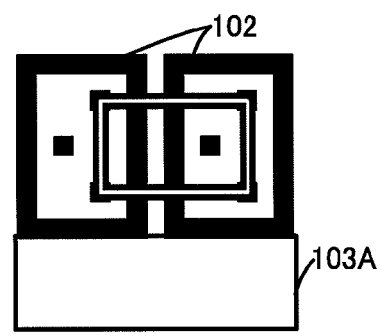
(c) 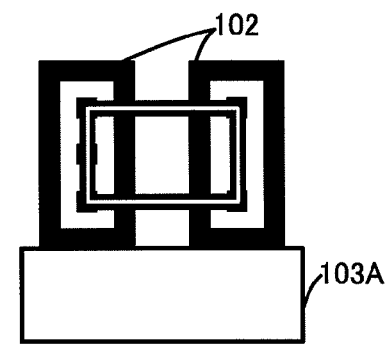
(d) 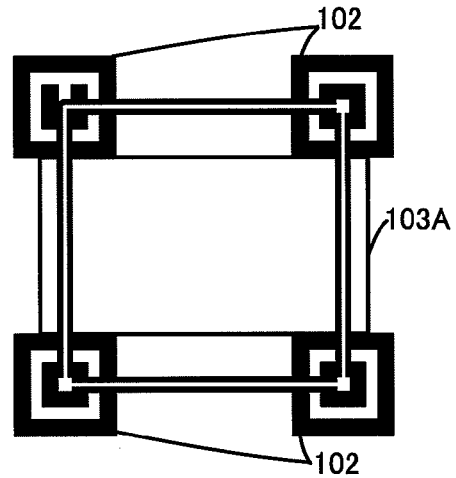

FIG.6
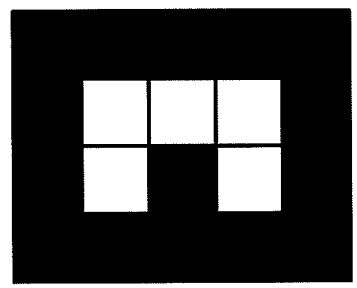
(a)
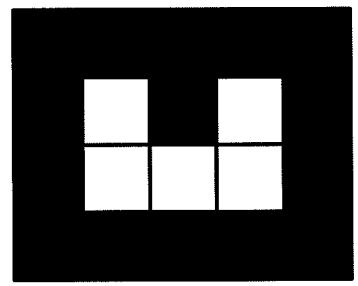
(b)
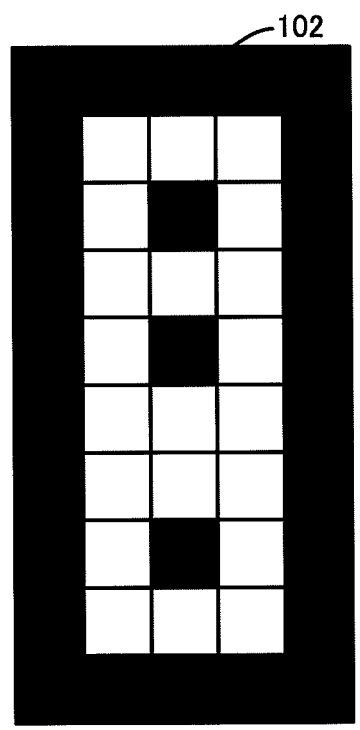
(c)

FIG.7
(a) 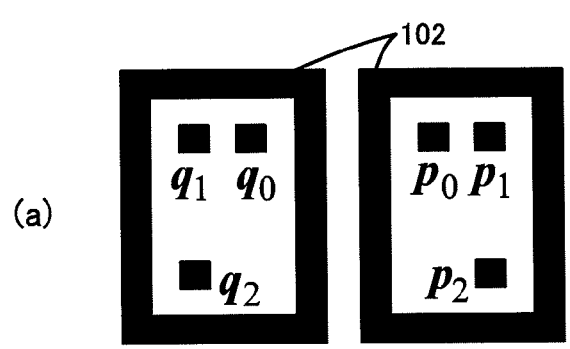
(b) 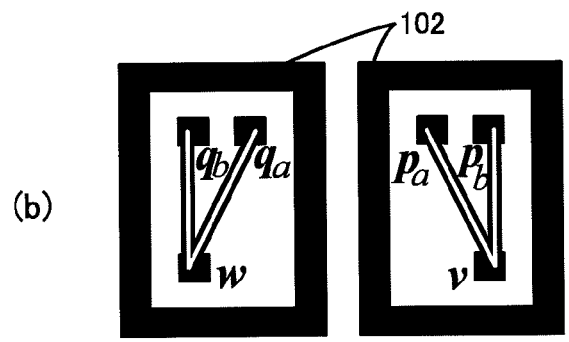
(c) 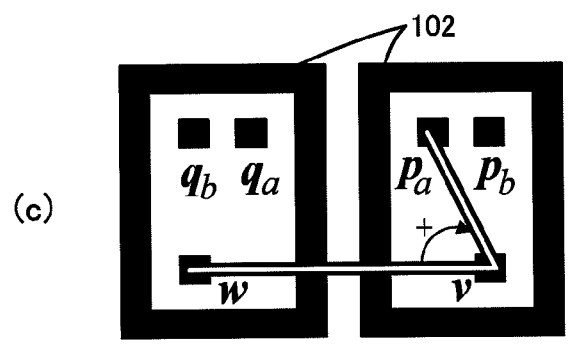
(d) 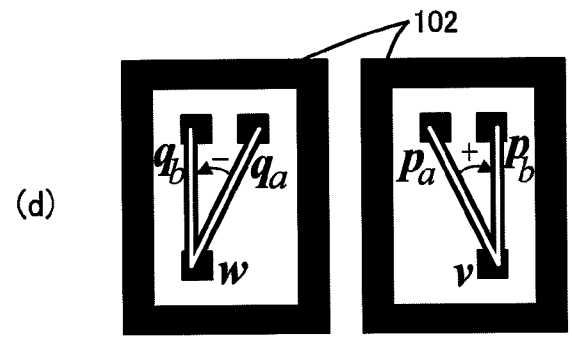

FIG. 8
(a) 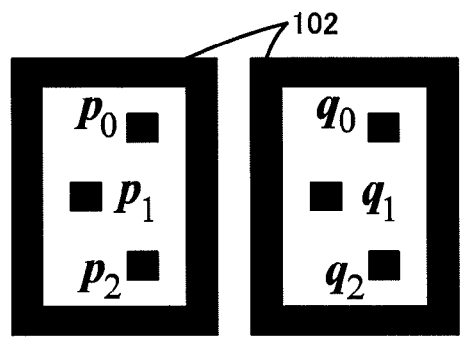
(b) 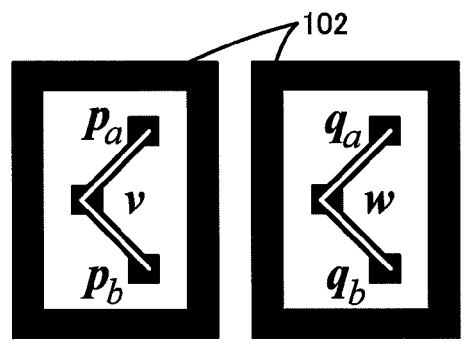
(c) 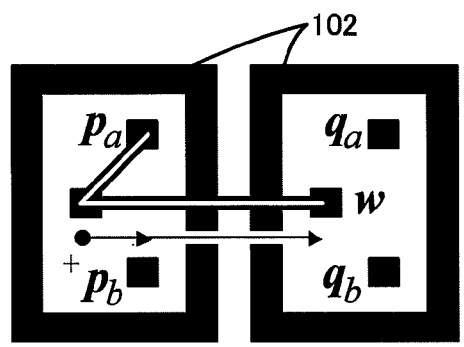
(d) 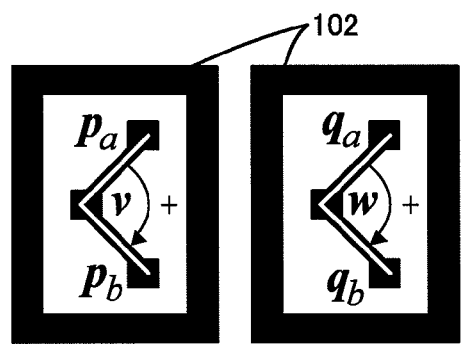

POSITION INFORMATION DETECTION DEVICE, POSITION INFORMATION DETECTION METHOD, AND POSITION INFORMATION DETECTION PROGRAM

TECHNICAL FIELD

This invention relates to a position information detection device, and method and program for same, which identifies an indicated position relative to a screen or another indication target plane.

BACKGROUND ART

In the past, systems have been developed which employ a CRT, LCD or other display device as well as devices to identify a position on the display screen thereof. One such example is a shooting game device. In such a shooting game device, various means may be employed to identify a position on the screen. Of these, the technologies disclosed in Patent Document 1, Patent Document 2, and Patent Document 3, cause a screen to be displayed on a display device according to the game progress, based on display signals from a game apparatus; by operating a gun-type controller or other means for indicating a screen position, a user irradiates the screen periphery with light or emits light from a light-emitting member on the screen periphery, and based on image capture results at the screen periphery, identifies the position on the screen at which the screen position indication means is aimed.
Patent Document 1: Japanese Patent No. 3422383
Patent Document 2: Japanese Patent Laid-open No. 11-305935
Patent Document 3: Japanese Patent Laid-open No. 2004-139155

However, the system of the above-mentioned Patent Document 1 has the following problems.

(1) Detection errors cannot be ignored because the indicated position or other detected numerical value is an approximate solution.

(2) In the device manufacturing stage, adjustments must be made in order to determine constants necessary for position detection, so that manufacturing processes are complex, and there are concerns that adjustment errors may be reflected in detection errors during device operation.

(3) The four light-emitting members which identify the video screen are not distinguished. Hence, at least based on the description in Patent Document 1 alone, the top, bottom, right, and left of the screen cannot be identified.

(4) When an image of the four light-emitting members and other disturbing light sources is captured simultaneously, it is difficult to distinguish the light-emitting members from the disturbing light sources, so that severe limitations are placed on the peripheral illumination environment during device operation.

Moreover, in the system of Patent Document 2, only an indicated position and distance information are detected, but in contrast with the system of Patent Document 1, exact solutions can be obtained. However, this method has the following problems.

(1) The structure of computations is complex, and a large amount of computation is required.

(2) Errors in the focal length due to differences between device units have an adverse effect on computation results because the focal length of the lens comprised by the image capture element is used in computations.

(3) An infrared light source is used to identify the indication target plane, but the infrared rays are distinguished from disturbing light sources based on brightness alone, so that once again, severe limitations are placed on the peripheral illumination environment during device operation.

(4) The device configuration on the screen side is complex and related constraints are imposed because an infrared light source is used which itself emits light from the target screen side. As a result, such devices are not suitable for use in the home.

Moreover, in the system of Patent Document 3, which was presented by the applicant of this application, only a position indicated by a gun-type controller is detected. This is insufficient for implementing a more varied and sophisticated game, for example by obtaining the angle of rotation around the gun axis, the distance to the display device, and other relative position information, and so the range of application is limited.

Further, in technology of the prior art such as described above, there are also problems arising from the image capture element used in image capture. That is, when using generic image capture elements, if the object or the image capture element moves comparatively rapidly, the image of the object is blurred, and the expected image recognition result cannot be obtained, so that target screen identification may fail. As one method for resolving this problem, an image capture element with a fast shutter speed can be used. However, such fast image capture elements are expensive compared with the image capture elements in wide use.

This invention is presented in order to solve the above-described problems of the prior art, and has as a principal object the provision of a position information detection device, method, and program, capable of detecting with high precision various position information using simple and easily recognized discrimination marks.

A further object of the invention is to provide a position information detection device, method, and program, capable of improving the success rate of position detection, even when using an inexpensive image capture element.

DISCLOSURE OF THE INVENTION

In order to attain the above objects, a position information detection device of this invention is characterized in having an image capture portion which, via a camera lens, captures images of discrimination marks arranged on the side of the indication target plane; a discrimination mark extraction portion which extracts images of geometric figures from images captured by the image capture portion; a reference rectangle extraction portion which extracts an image of a reference rectangle image formed by connecting specific points in the geometric figure image; a focal length calculation portion which, based on the coordinate system identified by the reference rectangle image, calculates the focal length of the camera lens of the image capture portion with respect to the indication target plane; and an indicated position calculation portion which, based on the coordinate system and on the focal length, calculates the indicated position of the image capture portion with respect to the indication target plane. This invention can also be regarded as a position information detection method and as a position information detection program to implement the functions of each of the above-described portions.

In this invention as described above, by using a coordinate system based on the reference rectangle image extracted from specific points of a geometric figure image, the focal length which is an internal parameter of the image capture portion, can be determined, and moreover the indicated position which is an external parameter, can be determined as an exact solution. Hence when there are individual differences between image capture portions, when focus changes occur during operation, when lenses are employed causing the focal length to change, and in similar cases, by determining the focal length during operation, high-precision detection can be performed.

The position information detection device of another aspect is characterized in having an image capture portion which, via a camera lens, captures images of discrimination marks arranged on the side of the indication target plane; a discrimination mark extraction portion which extracts images of geometric figures from images captured by the image capture portion; a reference rectangle extraction portion which extracts an image of a reference rectangle image formed by connecting specific points in the geometric figure image; a reference rectangle storage portion which stores the reference rectangle image extracted by the reference rectangle extraction portion; a focal length calculation portion which, based on the coordinate system identified by the reference rectangle image, calculates the focal length of the camera lens of the image capture portion with respect to the indication target plane; an indicated position calculation portion which, based on the coordinate system and on the focal length, calculates the indicated position of the image capture portion with respect to the indication target plane; and a reference rectangle inference portion which, when discrimination marks cannot be extracted by the discrimination mark extraction portion, infers the reference rectangle image based on the reference rectangle image stored in the reference rectangle storage portion. This aspect can also be regarded as a position information detection method and as a position information detection program to implement the functions of each of the above-described portions.

In the above aspect, even when the object or image capture element moves rapidly, and discrimination marks cannot be extracted from the image captured by the image capture portion, so that extraction of the reference rectangle image fails as a result, when the immediately preceding reference rectangle image has been successfully extracted or inferred, through reference rectangle inference processing the reference rectangle image can be satisfactorily inferred. Hence the success rate of position detection can be improved, without employing an expensive image capture element.

In another aspect, the reference rectangle inference portion is characterized in having a region calculation portion which, based on the reference rectangle image stored in the reference rectangle storage portion, calculates the neighborhood region of discrimination marks; a background light detection portion which detects background light to be blocked in the neighborhood region; a centroid inference portion which, based on detection results of the background light detection portion, infers the centroid of discrimination marks in the neighborhood region; and an inference portion which infers the reference rectangle image based on the centroid inferred by the centroid inference portion.

In the above aspect, the centroid of discrimination marks is inferred based on discrimination mark neighborhood region calculated based on the reference rectangle image stored immediately before, and by this means the reference rectangle image is inferred; hence the reference rectangle image can be inferred satisfactorily and more rapidly, while decreasing the amount of data to be processed and increasing speed.

Another aspect is characterized in having a coordination portion which associates the centroid inferred by the centroid inference portion with the reference rectangle image stored in the reference rectangle storage portion, for use in inference by the inference portion.

In the above aspect, even when the centroid cannot be inferred, vertices can be inferred based on the immediately preceding reference rectangle image, so that there is an increased probability that a reference rectangle can be obtained.

Another aspect is characterized in having an image capture portion position calculation portion which, based on the coordinate system and on the focal length, calculates the relative position of the image capture portion in a three-dimensional coordinate system set with the indication target plane as reference.

Another aspect is characterized in having a rotation angle calculation portion which, based on the coordinate systems before and after rotation of the image capture portion, calculates the rotation angle of the image capture portion.

In the above aspect, not only the indicated position relative to an indication target plane, but also such position information as the relative position or rotation angle of the image capture portion can be obtained, so that more variety and sophistication in both the game content and the range of application are possible.

Another aspect is characterized in that the specific points are the centroids of a plurality of geometric figures provided at the discrimination marks.

In the above aspect, geometric figures the centroids of which can be determined are used as discrimination marks, so that the configuration is simple, and extraction is also easy. Further, by providing characteristics, installation methods, and directionality for all of the geometric figures, identification of direction is also possible.

Another aspect is characterized in that the discrimination marks have light sources enabling identification of the geometric figures from images obtained by the image capture portion.

In the above aspect, the discrimination marks are light-emitting, so that the discrimination marks can be clearly recognized, regardless of the peripheral illumination environment.

Another aspect is characterized in that the image capture portion has a light-projection portion which irradiates the discrimination marks with light.

In the above aspect, the discrimination marks can be configured as reflection-type marks, so that installation is easy, and the invention is suitable for home-use applications.

Another aspect is characterized in that the image capture portion, discrimination mark extraction portion, reference rectangle extraction portion, focal length calculation portion, indicated position calculation portion, and reference rectangle inference portion are integrally formed.

In the above aspect, the overall configuration is simplified compared with configurations in which the image capture portion and similar are separate, and connection tasks between devices and similar can be simplified.

As explained above, by means of this invention, a position information detection device, method, and program can be provided, which are capable of detecting varied position information with high precision using simple and easily discriminated discrimination marks.

Further, by means of this invention, a position information detection device, method, and program can be provided, which can improve the success rate of position detection, even when using an inexpensive image capture element.

BRIEF DESCRIPTION OF THE DRAWINGS

FIG. 3 is an explanatory figure showing an example of discrimination marks used in the embodiment shown in FIG. 1;

FIG. 4 is an explanatory figure showing the positional relation between the discrimination marks of FIG. 3 and the screen display region;

FIG. 6 is an explanatory figure showing a discrimination mark extraction method;

FIG. 7 is an explanatory figure showing a method for extracting reference rectangle vertices for the discrimination marks of (a) in FIG. 3;

FIG. 8 is an explanatory figure showing a method for extracting reference rectangle vertices for the discrimination marks of (b) in FIG. 3;

BEST MODE FOR CARRYING OUT THE INVENTION

Figure 1:
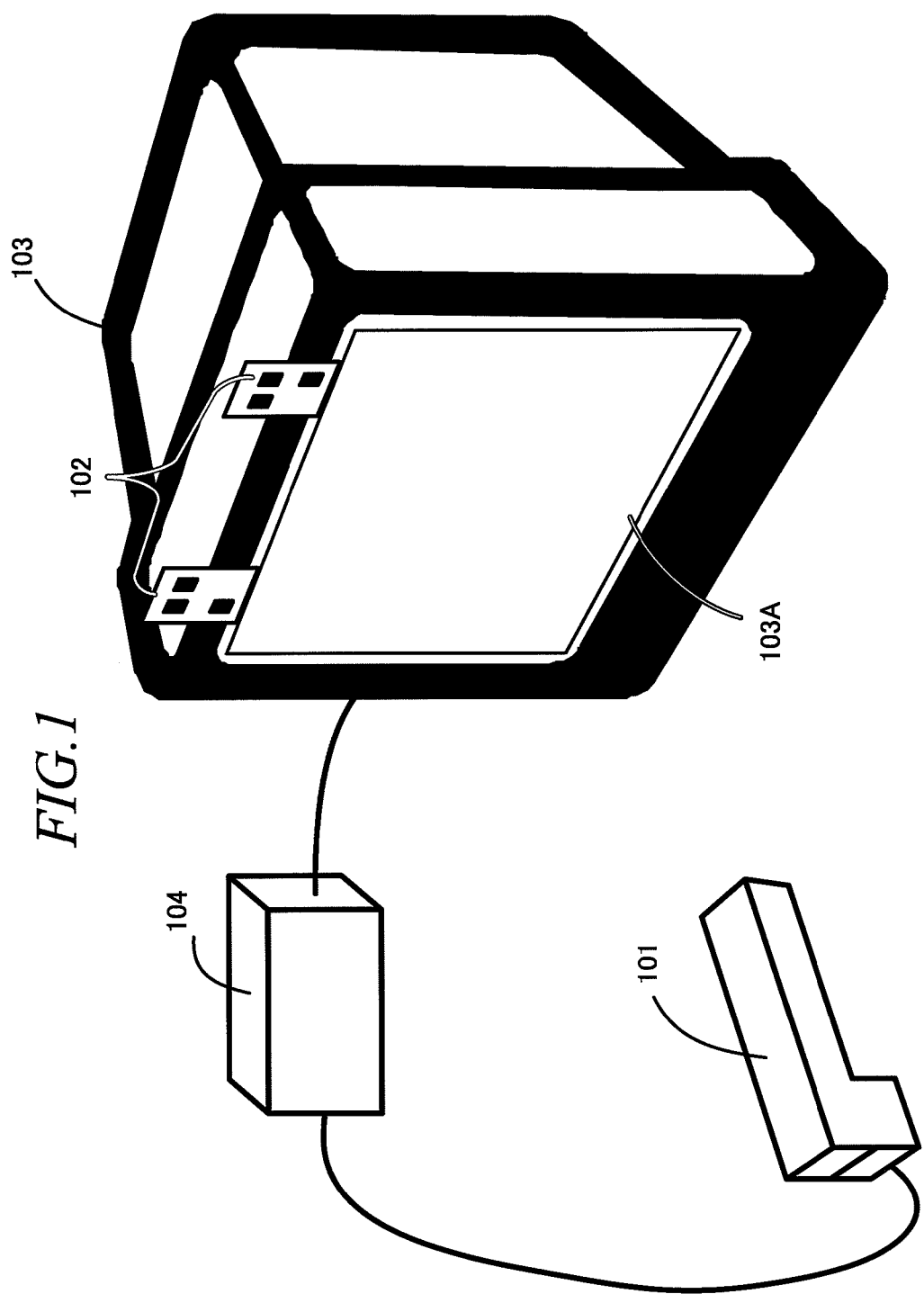
FIG. 1 is an overall configuration diagram showing a first embodiment of the invention.

Below, an embodiment is explained, referring to the drawings, in which a position information detection device of the invention is applied to a gun shooting-type game.

First Embodiment

Summary

Figure 2:
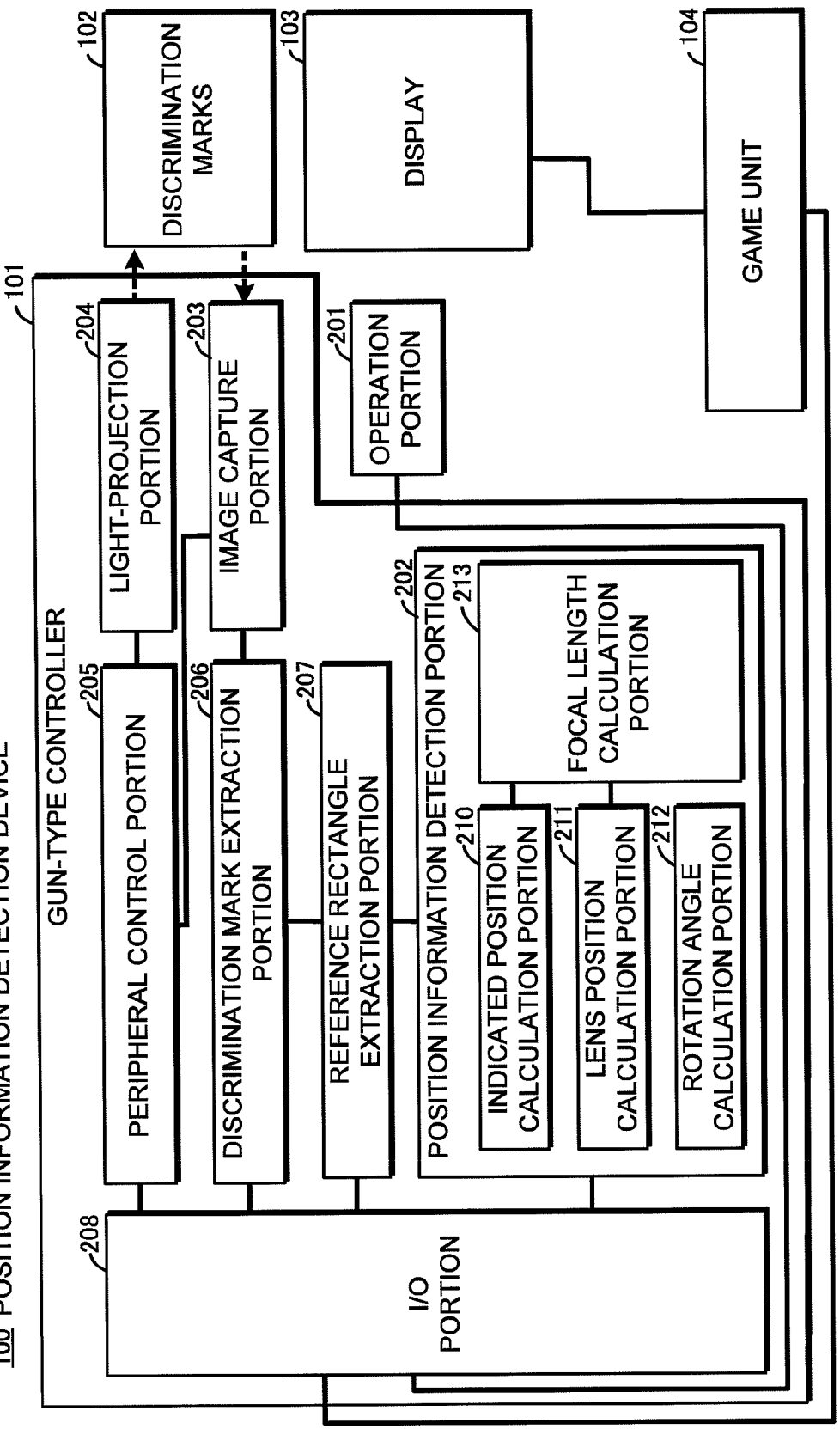
FIG. 2 is a functional block diagram of the embodiment shown in FIG. 1.

First, a summary of the embodiment is explained referring to FIG. 1 and FIG. 2. FIG. 1 is a perspective view showing an external view of the embodiment, and FIG. 2 is a functional block diagram thereof. That is, the position information detection device 100 of this embodiment is a system applied to a gun shooting-type game which uses a gun-type controller 101, a game unit 104, and a display 103.

In gun shooting-type games in general, a player aims a gun-type controller toward a target displayed in a screen display region of a display, and the game progresses based on judgments of the accuracy of the player's aim and similar. Hence it is necessary to detect, at the least, at which position within the screen display region (indicated position) the gun-type controller is aimed. Among such devices which detect such indicated positions, there are devices which capture images of discrimination marks displayed on the display or arranged on the periphery thereof, and which, by analyzing such images, calculate the indicated position.

In this embodiment, an image capture portion 203 which captures images of discrimination marks 102 arranged on a display 103, a position information detection portion 202 which detects position information including an indicated position, a discrimination mark extraction portion 206 which extracts discrimination marks, a reference rectangle extraction portion 207 which extracts a reference rectangle, and similar are mounted within the gun-type controller 101, in an integral configuration. Further, in this embodiment it is possible to detect not only an indicated position, but also the rotation angle of the gun-type controller 101 around the gun axis, the position relative to the display 103 (lens position), and other relative position information, so that the game content can be made more varied.

Configuration

Next, the configuration of this embodiment is explained in detail.

Display 103

The display 103 is a CRT, LCD, or other display device for use with television receivers, computers, and similar. Image signals are input to the display 103 according to the progress of the game program executed by the game unit 104. An image is displayed, according to input image signals, on a rectangular-shape image display region (indication target plane) 103A.

Discrimination Marks 102

A plurality of discrimination marks 102 are arranged on the periphery of the image display region 103A. These discrimination marks 102 have, in front view, geometric patterns (shapes). FIG. 1 is an example of arrangement of discrimination marks 102 at two places on the upper left and right of the image display region 103A. As the geometric pattern, for example, the examples shown in (a) through (c) of FIG. 3 may be employed. These are tall rectangular shapes, having a background portion (black peripheral frame) along the outer periphery, and having square-shape holes inside the background portion (black portions on the inside). However, any shape may be used which enables extraction of a reference rectangle which connects specific points (in this embodiment, centroids).

The discrimination mark 102 on the left in (a) of FIG. 3 has holes in three places, in the neighborhood of the upper-right corner, in the neighborhood of the upper-left corner, and in the neighborhood of the lower-left corner, as if the centroids thereof are along two perpendicularly-intersecting straight lines; the discrimination mark 102 on the right likewise has holes in three places, in the neighborhood of the upper-right corner, in the neighborhood of the upper-left corner, and in the neighborhood of the lower-right corner, as if the centroids thereof are along two perpendicularly-intersecting straight lines. The discrimination marks 102 on the left and right in (b) of FIG. 3 have holes in three places, in the top, the middle, and the bottom, so as to form a "<" symbol, with straight lines connecting the centroids intersecting in a right angle. Discrimination marks are not limited to these, and in principle, it is sufficient that the straight lines connecting the centroids describe a triangular shape having two equal sides making an angle of 90° or greater. The discrimination mark 102 on the left in (c) of FIG. 3 has holes in three places, at the top edge, in the center, and at the bottom edge, such that the straight line connecting the centroids is a vertical straight line; the discrimination mark 102 on the right has holes in two places, at the top and bottom edges, such that the straight line connecting the centroids is a vertical straight line.

Moreover, four discrimination marks 102 such as for example shown in (d) of FIG. 3 can be used. These are square shapes, installed at four places near the vertices of the image display region 103A, and have a background portion along the outer periphery (a peripheral black frame), and holes on the inside of the background portion (inner black portions). In the discrimination marks 102 on the upper-right, lower-right, and lower-left, the holes are square frame shapes; only the upper-left discrimination mark 102 has holes in the shape of two parallel rectangles.

The discrimination marks 102 described above are installed such that, as shown in (a) through (d) in FIG. 4, straight lines connecting the holes or the centroids of the inner portions form a virtual rectangle (a reference rectangle, described below) near the vertices of the image display region 103A. However, the reference rectangle need not be near the vertices. FIG. 4 is an explanatory figure, and the size of the image display region 103A is shown smaller for convenience.

The structures of discrimination marks 102 can be classified into two types, light-emitting and reflecting. In the case of light-emitting marks, the surface is configured such that the transmittance of light is low primarily in the holes and in background portions, and that light is transmitted and diffused in portions other than these, and a light source is provided which emits light from the interior, from the rear face toward the surface. When configuring a system using light-emitting discrimination marks 102, there is no need to mount a light-projection portion 204 as described below, but power must be supplied to the light sourced within the discrimination marks 102.

In the case of reflecting marks, a surface configuration is employed in which the reflectance of light is low primarily in the holes and the background portion, and the reflectance is high in other portions. In order to enable shooting at arbitrary positions, it is desirable that the material of the high-reflectance portions have retroreflective characteristics. In this embodiment, reflecting discrimination marks 102, which are easily installed, are used. As explained above, the holes and background portions of discrimination marks 102 must be such that boundaries with other portions can be optically discriminated, and so there may be no need to form actual physical holes, depressions, and similar. That is, a structure enabling distinction of boundaries based on colors, materials, and similar is sufficient, regardless of whether portions are formed in the same plane.

Game Unit 104

The game unit 104 is equipment which executes a prescribed program, generates image signals for display of game images according to the execution, and outputs the image signals to the display 103. This game unit 104 takes as input, from the position information detection portion 202, indicated position data for a point on the image display region 103A which has been specified using the gun-type controller 101 as well as similar other data; based on this data, prescribed game progress processing is performed according to the program execution. Hence the game unit may be, in addition to a home-use game unit, an arcade game unit, or a computer in which a game program has been installed.

Gun-Type Controller 101

The gun-type controller 101 has an operation portion 201; a position information detection portion 202; an image capture portion 203; a light-projection portion 204; a peripheral control portion 205; a discrimination mark extraction portion 206; a reference rectangle extraction portion 207; and an I/O portion 208.

The operation portion 201 is a trigger or similar, which, when pulled to a prescribed position in an operation performed by a finger of the user or similar, outputs an operation signal. The specific configuration of the operation portion 201 is in essence independent of this invention, and is not limited to a particular configuration. Hence there is no need for the operation portion to have the shape of a trigger, and the operation portion may for example be a push-button, or a toggle or other type of switch, or may be a sensor which detects the blockage of light.

The image capture portion 203 is configured principally from an image capture element, a lens, and an optical filter. The lens is installed near the muzzle of the gun-type controller 101, such that aim is taken along the optical axis thereof. The image capture element is installed such that the image capture plane perpendicularly intersects the optical axis on the interior side of the lens. The optical filter can satisfactorily pass only light in the wavelength range for image capture, and is either installed close to the lens, or is of the same material as the lens itself.

The light-projection portion 204 is configured from an optical element group which emits light primarily in a wavelength region which is the region for image capture of the image capture element. This light-projection portion 204 is installed inclined somewhat toward the outside from the optical axis on the lens periphery of the image capture portion 203. The peripheral control portion 205 is means for controlling light emission of the light-projection portion 204 and image capture of the image capture portion 203. For example, light emission timing control, and settings so as to enable adjustment of the light quantity of the light-projection portion 204, sensitivity of the image capture portion 203, and similar are possible.

The discrimination mark extraction portion 206 is means for removing disturbing light components from an image captured by the image capture portion 203 and extracting only the pattern of discrimination marks 102. The reference rectangle extraction portion 207 is means for extracting the above-described reference rectangle from the pattern of extracted discrimination marks 102. The position information detection portion 202 is means for detecting an indicated position in the image display region 103A, the lens position, rotation angle, and other external parameters of the camera (image capture portion 203), and the focal length and other internal parameters, based on the extracted reference rectangle and similar.

This position information detection portion 202 has an indicated position calculation portion 210 which calculates the indicated position, a lens position calculation portion 211 which calculates the lens position, a rotation angle calculation portion 212 which calculates the rotation angle, and a focal length calculation portion 213 which calculates the focal length. The specific processing performed in the discrimination mark extraction portion 206, reference rectangle extraction portion 207, and position information detection portion 202 is as explained in the description of device action below. The I/O portion 208 is means for controlling input/output with external equipment.

In each processing process, information which is extracted, calculated, and similar may be stored in memory or other storage means as appropriate for use in subsequent processing; being commonly performed in the prior art, however, such storage is omitted from the drawings.

Action

Figure 5:
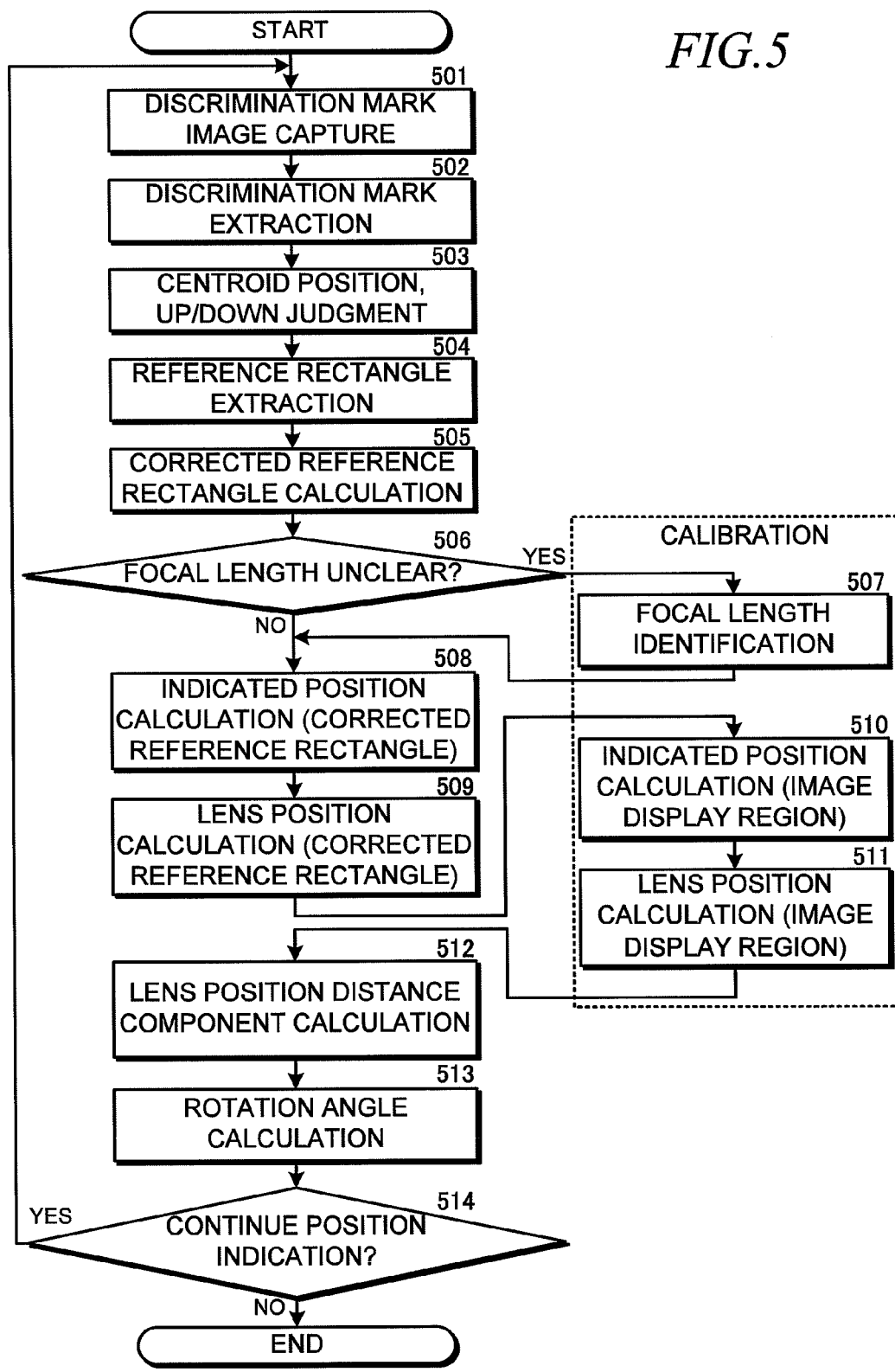
FIG. 5 is a flowchart showing the processing procedure of the first embodiment.

Processing to detect indicated positions and similar in the above embodiment is explained referring to the flowchart of FIG. 5 and the explanatory figures of FIG. 6 through FIG. 21. The following processing procedure is an example, and the order of processing may be modified so long as the information necessary for each processing stage is obtained in one of the preceding stages.

Discrimination Mark Image Capture: Step 501

First, when the gun-type controller 101 is being aimed in the vicinity of the image display region 103A of the display 103, light emitted from the light-projection portion 204 is reflected by the surfaces of discrimination marks 102, a portion of the reflected light is incident on the image capture portion 203, and an image is captured by the image capture element. When the emitted light does not reach the discrimination marks 102, the reflected light is of course not captured in an image. Further, when light-emitting discrimination marks 102 are used, and the light-projection portion 204 is omitted, light emitted from the discrimination marks 102 is incident on the image capture portion 203. The captured image is converted into image data (for example, a binary image or similar) suitable for processing.

Discrimination Mark Extraction: Steps 502, 503

Captured image data is analyzed by the discrimination mark extraction portion 206, and discrimination marks 102 are extracted. That is, the image data may contain geometric patterns of the discrimination marks 102 which are the object of the processing as well as other disturbing light. Hence the disturbing light components must be removed, and the discrimination marks 102 alone must be extracted.

This extraction processing may for example be performed as follows. As shown in FIG. 3, if the background portions and the internal holes of the discrimination marks 102 are convex figures, then from the original captured image and the binary image thereof, geometric patterns can be judged by inspecting the figure attributes in the captured image, as shown in FIG. 6.

First, verification is performed in the vertical direction, starting with components other than holes which are continuous in the horizontal direction (continuous components), then components which are not continuous due to the existence of holes appear (branching), and after components which are not continuous due to the existence of holes, connecting components (merging) which appear. The number of occurrences of branching and merging are counted, and the difference is determined. By this means, in the case of a correct discrimination mark 102 in which a hole surrounded by connecting components exists, the difference between the number of branchings and the number of mergings is always zero. Also, taking the area of a hole (the number of pixels forming the hole in a binary image) to be one unit, the number of holes, the area of connecting components, and the area of the holes are calculated.

For example, as indicated in Table 1, in the case of (a) of FIG. 6 the number of branchings is 1 and the number of mergings is 0, whereas in (b) the number of mergings is 1 and the number of branchings is 0, so that the image is not recognized as a discrimination mark. Also, differences in geometric patterns of the discrimination marks 102 can be judged based on the number of holes, the area of connecting components, and the area of holes. For example, in the case of the discrimination marks 102 shown in (d) of FIG. 3, the number of holes is 2 only in the discrimination mark 102 on the upper left, whereas the number of holes is 1 for the other three discrimination marks 102, so that only the discrimination mark 102 in the upper left can be judged to be different, and consequently this can be identified as the upper left.

TABLE 1

|  | Quantity | | |
| --- | --- | --- | --- |
|  | (a) | (b) | (c) |
| Number of branchings – number of mergings | 1 | −1 | 0 |
| Number of holes | 0 | 0 | 3 |
| Area of connecting components | 5 | 5 | 21 |
| Area of holes | 0 | 0 | 3 |

In the process of extracting geometric patterns of discrimination marks 102, the centroid position information for each hole in the captured image plane is stored. Centroids are calculated by applying well-known techniques. In cases such as that of the discrimination marks 102 in (d) of FIG. 3, the centroids of the discrimination marks 102 themselves may be used. Further, based on centroid position information and discrimination mark placement information, information related to positions and vertical orientation in the image display region 103A which is the indication region is identified.

Reference Rectangle Extraction: Step 504

Figure 9:
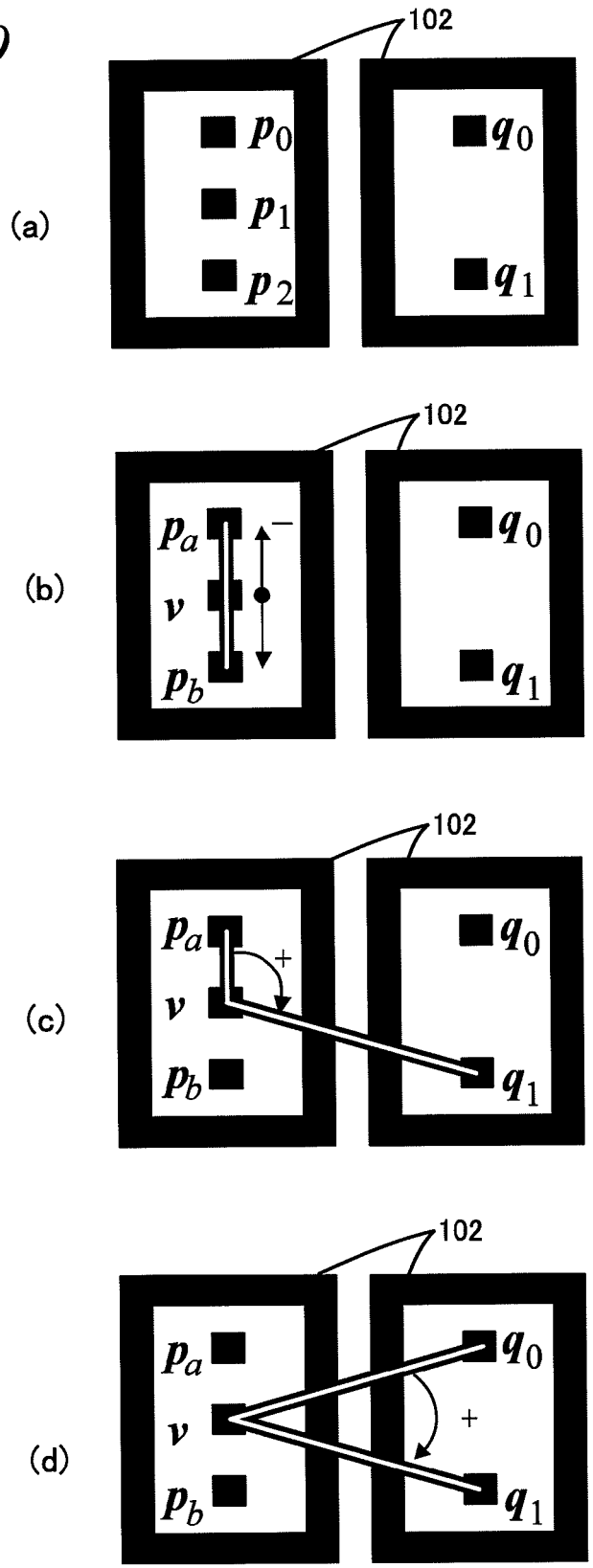
FIG. 9 is an explanatory figure showing a method for extracting reference rectangle vertices for the discrimination marks of (c) in FIG. 3.

Next, extraction of the reference rectangle by the reference rectangle extraction portion 207 is performed as follows. So long as the discrimination marks 102 do not move from their original installed positions, the positional relation between the virtual rectangle the vertices of which are the centroid points of the four discrimination marks 102 in (d) of FIG. 3 and FIG. 4 and the image display region 103A remains unchanged. This virtual rectangle is called the reference rectangle. As indicated in (a) through (c) of FIG. 3 and FIG. 4, when there are two discrimination marks 102, the reference rectangle is generated taking as vertices the centroid positions of holes in the geometric patterns. In this generation method, for example, a method such as those illustrated in FIG. 7 through FIG. 9 is used for the discrimination marks of (a) through (c) of FIG. 3 and FIG. 4.

The method shown in FIG. 7 is as follows. As shown in (a) of FIG. 7, let the centroid positions of the holes in one discrimination mark 102 be $p_i$, and let the centroid positions of holes in the other discrimination mark be $q_i$. Here, [i=0 . . . 2]. Next, as shown in (b) of FIG. 7, let the point $p_i$ for which the inner product of two difference vectors $(p_j-p_i)\cdot(q_k-q_i)$ is maximum be the common point v. Here, [j,k≠i]. Similarly for $q_i$, the common point w is determined. Then v and w are vertices of the reference rectangle. The remaining centroid positions are then $p_i$, $q_i$ [i=a,b].

Then, as shown in (c) of FIG. 7, when the vector product $(w-v)\times(p_i-v)$ is negative, the discrimination mark having $p_i$ is taken to be a reference mark, and when the product is positive, the discrimination mark having $q_i$ is taken to be a reference mark. Then, as shown in (d) of FIG. 7, when the reference mark is the mark with $q_i$, if the vector product $(q_a-w) \times (q_b-w)$ is negative then $q_b$ is taken to be a reference vertex, and if positive, $q_a$ is taken to be a reference vertex. Similarly, if the vector product $(p_a-v) \times (p_b-v)$ is negative then $p_a$ is the remaining vertex, and if positive then $p_b$ is the vertex.

The method shown in FIG. 8 is as follows. As shown in (a) of FIG. 8, let the centroid positions of holes in one of the discrimination marks 102 be $p_i$, and the centroid positions in the other mark be $q_i$. Here [i=0 . . . 2]. Then, as shown in (b) of FIG. 8, let the common point $p_i$ for which the inner product of two difference vectors $(p_j-p_i) \cdot (p_k-p_i)$ is minimum be v. Here, $[j,k \neq i]$. Similarly for $q_i$, the common point w is determined. The remaining centroid positions are then $p_i$, $q_i$. Here, [i=a,b].

Then, as shown in (c) of FIG. 8, when the inner product $(w-v) \cdot (p_i-v)$ is negative, the discrimination mark 102 having $q_i$ is taken to be a reference mark, and when positive, the mark having $p_i$ is taken to be a reference mark. And, as shown in (d) of FIG. 8, when the reference mark is $p_i$, if the vector product $(p_a-v) \times (p_b-v)$ is negative then $p_b$ is a reference vertex, and if positive $p_a$ is a reference vertex. Similar operations are performed when the reference mark is $q_i$. The remaining $p_i$, $q_i$ other than v and w are the remaining vertices of the reference rectangle.

The method shown in FIG. 9 is as follows. As shown in (a) of FIG. 9, the discrimination mark 102 having three holes is taken to be a reference mark, and the hole centroid positions are $p_i$. Here [i=0 . . . 2]. The hole centroid positions of the other discrimination mark 102 are $q_i$, and are two vertices of the reference rectangle. Here [i=0,1]. Next, as shown in (b) of FIG. 9, the common point $p_i$ for which the inner product of two difference vectors $(p_j-p_i) \cdot (p_k-p_i)$ is negative is taken to be v. Here $[j,k \neq i]$. The remaining centroid positions are $p_i$, where [i=a,b].

Then, as shown in (c) of FIG. 9, when the vector product $(p_a-v) \times (q_i-v)$ is negative $p_b$ is taken to be a reference vertex, and when positive, $p_a$ is a reference vertex. The remaining $p_i$ are then the remaining vertices of the reference rectangle. And as shown in (d) of FIG. 9, by inspecting the sign of the vector product $(q_0-v) \times (q_1-v)$, the order of vertices along the edges of the reference rectangle can be obtained. In this example, the order $[p_a, q_0, q_1, p_b]$ is obtained as an example.

In order that the reference rectangle be a rectangle as its name implies, the discrimination marks 102 must be configured and installed such that, when the reference rectangle is orthogonally projected onto the plane in which the image display region 103A exists in the direction normal to the plane, the projected image is a rectangle. Further, installation must be performed such that the surface of the discrimination marks 102 is on the plane in which the image display region 103A exists, and such that the edges in the horizontal direction of the reference rectangle and of the image display region 103A are parallel. Further, when the lens has distortion, distortion correction is performed at least for all the extracted reference rectangle vertices. If correction is not performed, errors due to distortion are included in the detected indicated position and other information.

In the position information detection portion 202, external parameters and internal parameters in the image display region 103A are detected based on the reference rectangle extracted as described above. In this embodiment, external parameters of the camera (image capture portion 203) are defined to be the indicated position in the indication region (two dimensions), the rotation angle around the camera lens optical axis (one dimension), and the position of the camera lens relative to the indication region (three dimensions). Parameters other than the rotation angle are normalized as explained below.

Figure 10:
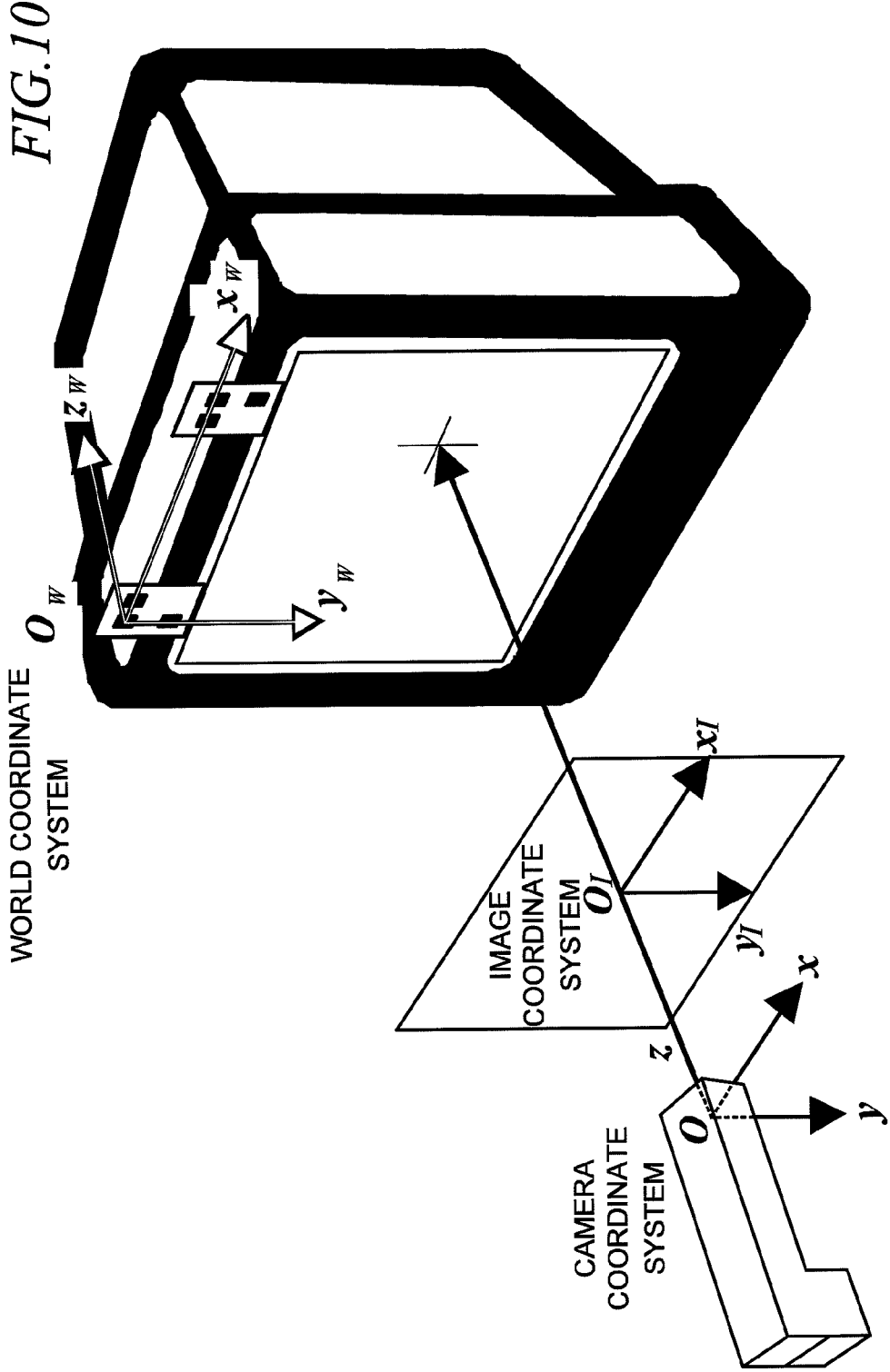
FIG. 10 is an explanatory figure showing the coordinate system used in the embodiment shown in FIG. 1.

Further, in this embodiment, the following coordinate system is established in the real three-dimensional space in which the gun shooting game is played, in order to calculate external parameters and internal parameters (see FIG. 10). The origin of the world coordinate system $O_w$-$x_w y_w z_w$ is positioned at the upper-left vertex of the reference rectangle; the $x_w$ and $y_w$ axes are respectively along the horizontal and vertical directions of the reference rectangle; and the $z_w$ axis coincides with the normal to the plane of the reference rectangle. The origin of the camera coordinate system O-xyz is positioned at the principal point of the lens; the x and y axes are along the horizontal and vertical directions respectively of the light-receiving face of the image capture element; and the z axis coincides with the optical axis. The origin of the image coordinate system $O_f$-$x_f y_f$ is positioned in the center of the image capture element light-receiving face, and the $x_f$ and $y_f$ axes are along the horizontal and vertical directions respectively of the light-receiving face. The normal to the image capture element light-receiving face coincides with the z axis, and the distance from the light-receiving face to the lens principal point is taken to be the focal length f. However, f may be an unknown quantity.

The plane of the image capture element light-receiving face, in which the image coordinate system is established, is the plane z=f in the camera coordinate system. From the coordinate system definitions stated above, an arbitrary point $p_f=(x_f,y_f)^T$ can easily be expanded to a point $P=(x_f,y_f,f)^T$ in the camera coordinate system by adding one dimension to this component. In order to facilitate the expansion, pixels in a captured image are used as the units of all components in both coordinate systems.

Figure 11:
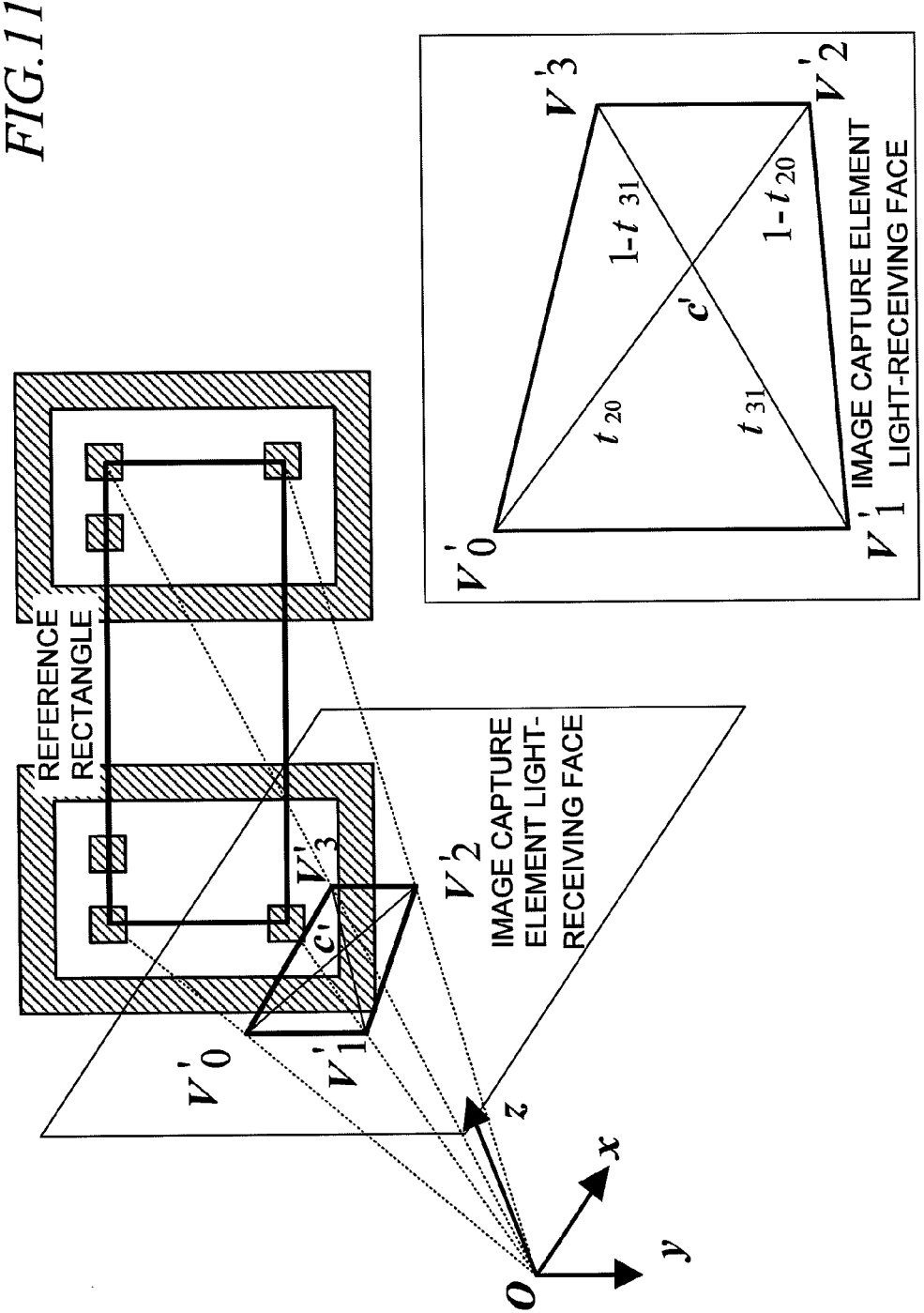
FIG. 11 is an explanatory figure showing a reference rectangle image captured in the embodiment shown in FIG. 1.

When images of all the discrimination marks 102 have been captured correctly, each of the vertices $V'_i$ (i=0 . . . 3) of the reference rectangle projected onto the image capture element light-receiving face via the lens is the centroid point of a discrimination mark 102 itself or of an internal hole as shown in FIG. 11. Here, a pinhole lens model is used.

Corrected Reference Rectangle Calculation: Step 505

When the normal to the image capture element light-receiving face does not coincide with the normal to the surface of the discrimination marks 102, the reference rectangle image on the light-receiving face is affected by projection distortion. The projection distortion is removed because the correct indicated position or other information cannot be detected from a reference rectangle image which has been affected by projection distortion. That is, the reference rectangle extraction portion 207 must obtain the corrected reference rectangle resulting from an inverse projection transformation of the reference rectangle image. Projection distortion in the reference rectangle image must always be removed because the captured image cannot be used to determine whether the two normals coincide. The reference rectangle image described in the Scope of Claims is a broad concept which includes such corrected reference rectangle images.

The center point of the reference rectangle, that is, the point of intersection c' of the diagonals, divides each of the two diagonals as $t_{20}$: $(1-t_{20})$ and $t_{31}$:$(1-t_{31})$, as shown in FIG. 11. Here $t_{20}$ and $t_{31}$ are as in equations (1) and (2) using $V'_i$. Here det[A B] is the determinant of the square matrix comprising the minors A, B.

[Equation 1]

$$t_{20} = \frac{\det[(V_1' - V_0') \ (V_3' - V_1')]}{\det[(V_2' - V_0') \ (V_3' - V_1')]} \quad (1)$$

[Equation 2]

$$t_{31} = \frac{\det[(V_1' - V_0') \ (V_2' - V_0')]}{\det[(V_2' - V_0') \ (V_3' - V_1')]} \quad (2)$$

Figure 12:
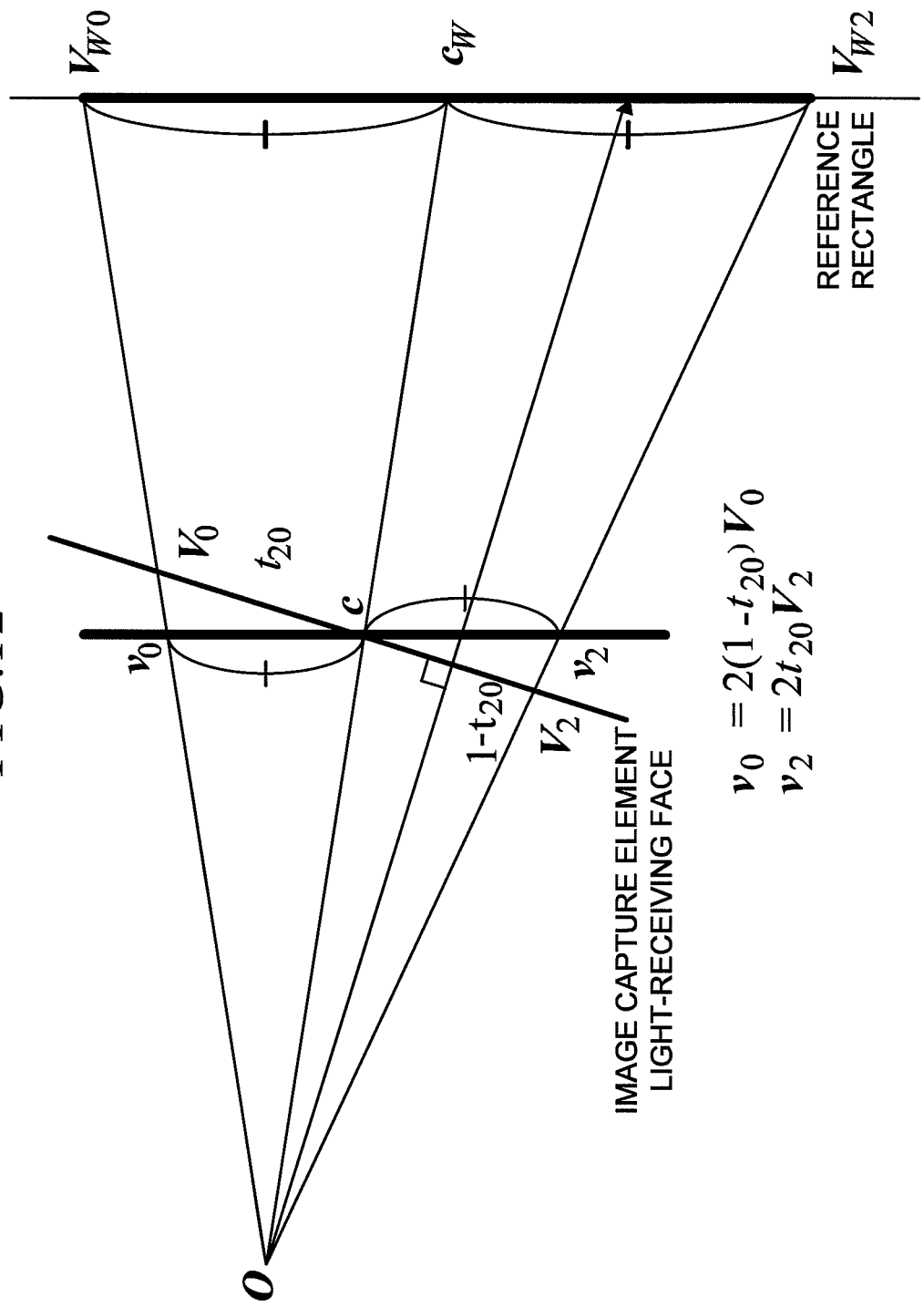
FIG. 12 is an explanatory figure showing a method of calculation of a corrected reference rectangle image in the embodiment shown in FIG. 1.

When the reference rectangle image is affected by projection distortion, $t_{20}=t_{31}=0.5$ does not obtain, and c' is not the center point of the diagonals. Here, as indicated in FIG. 12, $V'_i$ and c' are expanded to $V_i$ and c in the camera coordinate system, and a plane containing the origin O of the camera coordinate system and $V_0$, c, and $V_2$ is considered. Equation (3) obtains for an arbitrary point $v_0 = t_0 V_0$ on the straight line passing through O and $V_0$ and an arbitrary point $v_2 = t_2 V_2$ on the straight line passing through O and $V_2$.

[Equation 3]

$$c - v_0 = v_2 - c \quad (3)$$

That is, $v_0$ and $v_2$ are the endpoints of a line segment the center point of which is c. Here,

[Equation 4]

$$c = (1 - t_{20}) V_0 + t_{20} V_2 \quad (4)$$

and so rearranging equation (3), equation (5) is obtained.

[Equation 5]

$$v_0 + v_2 = 2c = 2(1 - t_{20}) V_0 + 2 t_{20} V_2$$

$$t_0 = 2(1 - t_{20})$$

$$t_2 = 2 t_{20} \quad (5)$$

Similarly, in order to satisfy equation (6) with respect to an arbitrary point $v_1 = t_1 V_1$ on the straight line passing through O and $V_1$ and an arbitrary point $v_3 = t_3 V_3$ on the straight line passing through O and $V_3$, equation (7) is obtained.

[Equation 6]

$$c - v_1 = v_3 - c \quad (6)$$

[Equation 7]

$$t_1 = 2(1 - t_{31})$$

$$t_3 = 2 t_{31} \quad (7)$$

Hence as is seen from FIG. 12, only segments having as endpoints $v_0$, $v_2$ satisfying equation (3) are parallel to the corresponding diagonal of the reference rectangle. Further, from equation (6), similar remarks can be made with respect to $v_1$ and $v_3$ also, so that the plane C containing $v_i$ (i=0 ... 3) is parallel to the plane R containing the reference rectangle, and the quadrilateral the vertices of which are $v_i$ is a rectangle. That is, an image is obtained which is the result of inverse projection transform of the above-described reference rectangle image (corrected reference rectangle image).

Focal Length Calculation: Steps 506, 507

However, when the focal length f is unknown, expansion from the image coordinate system to the camera coordinate system is not uniquely determined. Hence as is explained with respect to calibration below, the calculated focal length f is determined by the focal length calculation portion 213.

Indicated Position Calculation (corrected reference rectangle): step 508

Figure 13:
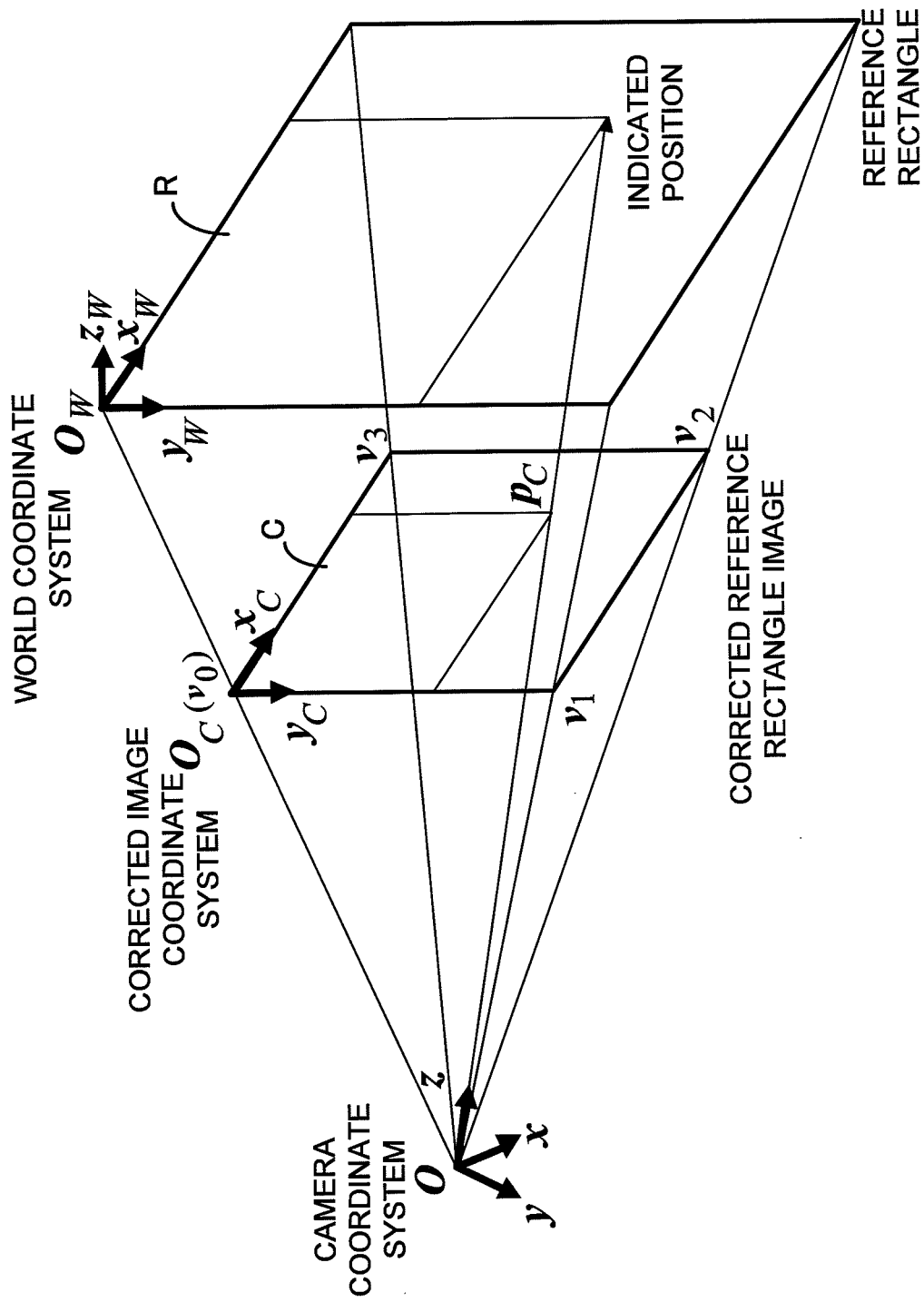
FIG. 13 is an explanatory figure showing a method of identifying an indicated position in the embodiment shown in FIG. 1.

When the focal length f has been identified, the above-described corrected reference rectangle image and plane C are used to determine the camera external parameters. First the indicated position calculation portion 210 calculates the indicated position in the reference rectangle. That is, as shown in FIG. 13, the quadrangular pyramid formed by the corrected reference rectangle and the origin O of the camera coordinate system is a shape similar to the quadrangular pyramid formed by the reference rectangle and the origin O. Hence the corrected image coordinate system $O_C$-$x_C y_C$ is determined similarly to the $x_w$, $y_w$ axes of the world coordinate system in the plane C, and when normalization is performed such that the width and height of the reference rectangle and corrected reference rectangle image are both 1, the normalized coordinates are the same for the points of intersection with the planes C and R of a straight line passing through O.

Hence as shown in FIG. 13, the indicated position in the corrected reference rectangle image can be determined as the normalized coordinates $p_C$ in the corrected reference rectangle image of the point of intersection p of the camera coordinate system z axis with the plane C. Here if the unit vector in the z-axis direction is $e_z = (0,0,1)^T$, and the vector normal to the plane C is $n_C = v_{20} \times v_{31}$, then p and $p_C$ are as given by equations (8) and (9). Separately from this, as a method for determining the indicated position without using the focal length, the method described in Patent Document 3 can be applied.

[Equation 8]

$$p = \frac{n_c \cdot v_0}{n_c \cdot e_z} e_z \quad (8)$$

[Equation 9]

$$p_c = \begin{pmatrix} \frac{(p - v_0) \cdot (v_3 - v_0)}{|v_3 - v_0|^2} \\ \frac{(p - v_0) \cdot (v_1 - v_0)}{|v_1 - v_0|^2} \end{pmatrix} \quad (9)$$

Lens Position Calculation (corrected reference rectangle): Step 509

Figure 14:
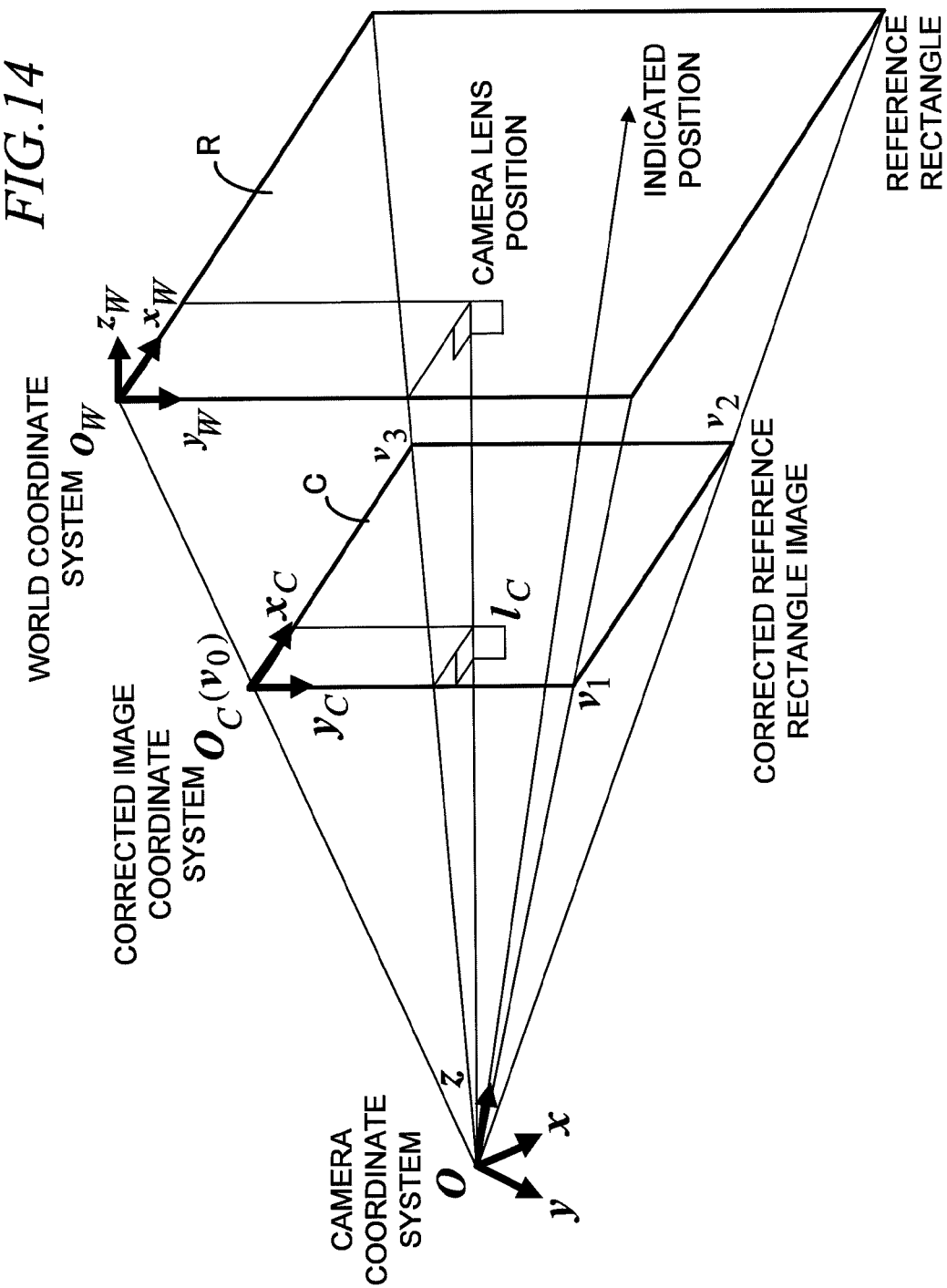
FIG. 14 is an explanatory figure showing a method of identifying the camera lens position in the embodiment shown in FIG. 1.

As shown in FIG. 14, of the parameters for the camera lens position relative to the indication region, the two components other than the distance-direction component are defined as normalized coordinates of the point of intersection of the vertical line dropped from the lens principal point with the plane R. Hence these two components are equivalent to determining the normalized coordinates $l_C$ in the corrected image coordinate system of the point of intersection l of the vertical line dropped from the lens principal point to the plane C in the camera coordinate system. Using the normal vector $n_C$ to the plane C described above, l and $l_C$ are as given by equations (10) and (11).

[Equation 10]

$$l = \frac{n_C \cdot v_0}{|n_C|^2} n_C \quad (10)$$

[Equation 11]

$$l_C = \begin{pmatrix} \frac{(l - v_0) \cdot (v_3 - v_0)}{|v_3 - v_0|^2} \\ \frac{(l - v_0) \cdot (v_1 - v_0)}{|v_1 - v_0|^2} \end{pmatrix} \quad (11)$$

Calculation of Indicated Position and Lens Position (image display region): Steps 510, 511

The two components other than the distance component between the indicated position and the camera lens position are normalized by the reference rectangle and the corrected reference rectangle. However, renormalization is performed relative to the image display region 103A because ultimately the indicated position is to be identified relative to the image display region 103A of the display 103. This processing is explained in the calibration described below.

Lens Position Distance Component Calculation: Step 512

Of the components of the camera lens position relative to the indication region, the distance-direction component is defined as a normalized coordinate when the $z_w$ component of the camera lens initial position, set at the time of calibration in the world coordinate system, is normalized to 1. However, the $z_w$ component cannot be measured directly. Hence the relation of equation (12) is considered, using the focal length f and real coefficient $k_C$, when projecting a line segment of length X on plane R through the lens onto plane C as a line segment image of length x' from the position at distance d between the lens and plane R, during calculation of the distance component in the lens position calculation portion 211.

[Equation 12]

$$x' = \frac{1}{k_C} \cdot \frac{f}{d} X \quad (12)$$

Even when the image capture portion 203 captures the reference rectangle over the same distance, if there is a change in the remaining two components of the camera lens position, then the distance between the lens principal point and plane C changes. The extent of this change is represented by the coefficient $k_C$ of equation (12). This coefficient $k_C$ is determined by the following equation (13).

[Equation 13]

$$k_C = \frac{|n_C|}{n_C \cdot v_0} f \quad (13)$$

From the above, the length $x = k_C x'$ of the line segment length corrected for the change in camera lens position is always inversely proportional to the distance d, and so the normalized distance can be determined using the line segment length x.

Here, the above-described line segment of length x in plane R is taken to be a horizontal or vertical edge of the reference rectangle. Further, let the length of the line segment image on plane C with the camera lens in the initial position be $x_i$. In subsequent system operation, the length x of the line segment image is used to determine the normalized distance $z_1$ which is desired according to equation (14). Here $x_i$ and x are both corrected for the effects of changes in the camera lens position.

[Equation 14]

$$z_l = \frac{x_i}{x} \quad (14)$$

Rotation Angle Calculation: Step 513

Figure 15:
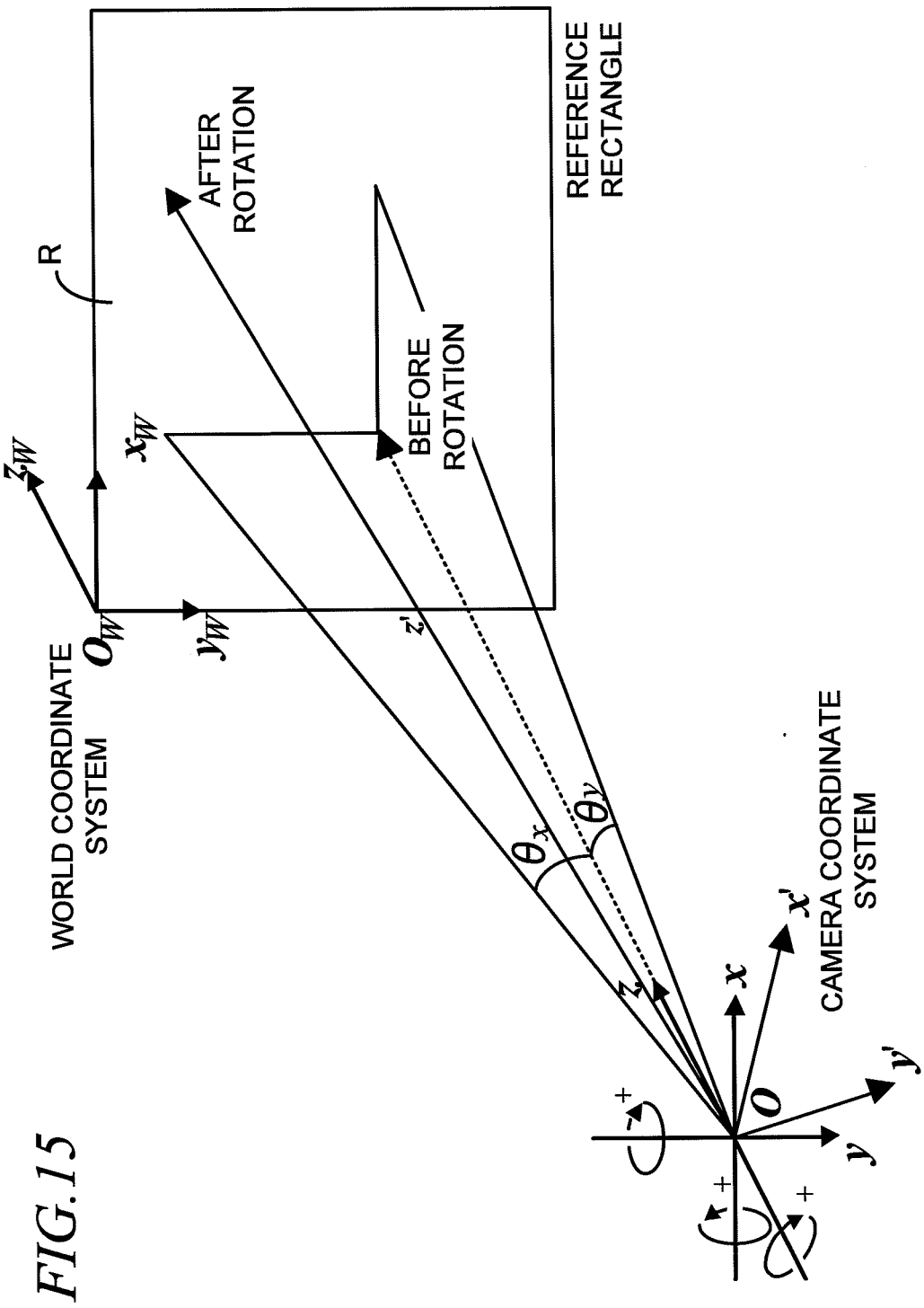
FIG. 15 is an explanatory figure showing a method of rotation angle identification in the embodiment shown in FIG. 1.

The rotation angle calculation portion 212 can determine the rotation angle around the camera lens optical axis without relying on the focal length f. Here, the principal position of the lens is fixed without loss of generality, and an operation to specify an arbitrary point on the plane R without rotation around the optical axis is considered. That is, as shown in FIG. 15, in the world coordinate system and the camera coordinate system, the $x_w$ axis and x axis are parallel, and the $y_w$ axis and y axis are parallel; if the rotation angle around the x axis is $\theta x$ and the rotation angle around the y axis is $\theta y$, then the above operation is equivalent to ordered rotation around both axes of the optical axis. The order of axis rotation differs depending on selection of the plane relative to which there is no rotation around the optical axis in the above indication operation. In this embodiment, it is assumed that the $y_w$ axis direction is the vertical direction, in keeping with actual subjective use, and so the $x_w z_w$ plane is taken as reference; in this case, optical axis rotation must be performed in the order of rotation around the x axis, and then rotation around the y axis.

On the other hand, in the camera coordinate system, the above rotation transformation can be regarded as a transformation in which the plane R is rotated in order through $-\theta y$ around the y axis and then through $-\theta x$ around the x axis. The composite rotation matrix R for this transformation is given by equation (15).

[Equation 15]

$$R = \begin{pmatrix} \cos\theta_y & 0 & -\sin\theta_y \\ -\sin\theta_x \sin\theta_y & \cos\theta_x & -\sin\theta_x \cos\theta_y \\ \cos\theta_x \sin\theta_y & \sin\theta_x & \cos\theta_x \cos\theta_y \end{pmatrix} \quad (15)$$

From the above R, two arbitrary points $p_{Wi}=(x_{Wi}, y_{Wi}, 0)$ (i=0,1) on plane R are projected onto points on the light-receiving face of the image capture element in the image coordinate system as points $p_{Ii}$ as described by equation (16), using the real constant Z and corresponding real coefficients $k_i$.

[Equation 16]

$$p_{Ii} = k_i \begin{pmatrix} \cos\theta_y x_{Wi} - \sin\theta_y Z \\ -\sin\theta_x \sin\theta_y x_{Wi} + \cos\theta_x y_{Wi} - \sin\theta_x \cos\theta_y Z \end{pmatrix} \quad (16)$$

Noting that the $x_1$ components of the $p_{Ii}$ in equation (16) do not contain a term in $y_{Wi}$, when $x_{Wi}$ are fixed arbitrarily, the difference vector $p_{II0}=p_{I1}-p_{I0}$ is given by equation (17).

[Equation 17]

$$P_{I10} = \begin{pmatrix} 0 \\ k \end{pmatrix} \quad (17)$$

(where k is a function of $x_{Wi}$ or the like)

That is, equation (17) represents the projection onto the image capture element of a line segment parallel to the $y_w$ axis on plane R, as a line segment image always having a fixed angle with respect to the $y_I(x_I)$ axis, when the gun-type controller 101 is not rotated around the camera lens optical axis. Hence when an edge in the $y_w$ axis direction of the reference rectangle is projected onto the image capture element, the angle between the line segment image prior to rotation around the optical axis (the initial attitude of the gun-type controller 101 during calibration, described below) and the line segment image after rotation around the optical axis is the rotation angle around the camera lens optical axis. If the endpoints of the former line segment image are $V_{Ii}$ (i=0,1), and the endpoints of the latter are $v_{Ii}$ (i=0,1), where i indicates one end-point of the original image, then the cosine and sine of the rotation angle $\theta_z$ are given by equations (18) and (19) respectively.

[Equation 18]

$$\cos\theta_z = \frac{(v_{l1} - v_{l0}) \cdot (V_{l1} - V_{l0})}{|v_{l1} - v_{l0}||V_{l1} - V_{l0}|} \quad (18)$$

[Equation 19]

$$\sin\theta_z = -\frac{\det[(v_{l1} - v_{l0})(V_{l1} - V_{l0})]}{|v_{l1} - v_{l0}||V_{l1} - V_{l0}|} \quad (19)$$

Calibration: Steps 507, 510, 511

As described above, all camera external parameters can be determined. However, as explained above, in order to calculate the indicated position and camera lens position, the focal length f must be determined at least once. Further, the two components of the indicated position and lens position other than the distance-direction component must be renormalized with reference to the image display region. Also, to determine the distance component and rotation angle around the optical axis of the camera lens position, the initial position and attitude of the gun-type controller 101, relative to which measurements are performed, must be determined. The task of resolving these issues is called calibration, and is explained below.

Focal Length Determination: Step 507

Focusing on the face that the lengths of the two diagonals of the reference rectangle are equal, a condition for use in determining f can be derived as follows.

First, let

[Equation 20]

$$v_{20} = v_2 - v_0 = (x_{20}, y_{20}, z_{20})^T, v_{31} = v_3 - v_1 = (x_{31}, y_{31}, z_{31})^T \quad (20)$$

Here, $v_n$ are the vertices of the corrected reference rectangle shown for example in FIG. 12 and FIG. 13.

[Equation 21]

$$v_{20} = 2\{(1-t_{20})V_2 - t_{20}V_0\} \quad (21)$$

Hence

[Equation 22]

$$z_{20} = 2\{(1-t_{20})f - t_{20}f\} = 2(1-2t_{20})f \quad (22)$$

And similarly,

[Equation 23]

$$z_{31} = 2(1-2t_{31})f \quad (23)$$

is obtained. Here, the lengths of the diagonals are equal, so that

[Equation 24]

$$|v_{20}|^2 = |v_{31}|^2 \quad (24)$$
$$(x_{20}^2 + y_{20}^2) - (x_{31}^2 + y_{31}^2) = -(z_{20}^2 - z_{31}^2)$$
$$= -4\{(1-2t_{20})^2 - (1-2t_{31})^2\}f^2$$

and therefore

[Equation 25]

$$f^2 = -\frac{(x_{20}^2 + y_{20}^2) - (x_{31}^2 + y_{31}^2)}{4\{(1-2t_{20})^2 - (1-2t_{31})^2\}} \quad (25)$$

[Equation 26]

$$f = \sqrt{-\frac{(x_{20}^2 + y_{20}^2) - (x_{31}^2 + y_{31}^2)}{4\{(1-2t_{20})^2 - (1-2t_{31})^2\}}} \quad (26)$$

(where $t_{20} \neq t_{31}$)

In order to determine the focal length f, from equation (26), it is necessary that $t_{20} \neq t_{31}$. That is, when the captured reference rectangle image has the shape of a rectangle or an axially symmetric trapezoid, calculation is not possible. Hence in focal length calibration, from a position which for example directly apprehends the center of the image region, calibration must be performed with an attitude in which the camera lens optical axis is moved about any one of the vertex positions.

In a system in which the focal length is fixed, calibration must be performed at least once; but in a system in which the focal length changes due to use of a zoom lens or similar, the focal length must be determined continuously for each captured image.

Calculation of Indicated Position in Image Display Region and Lens Position: Steps 510, 511

Figure 16:
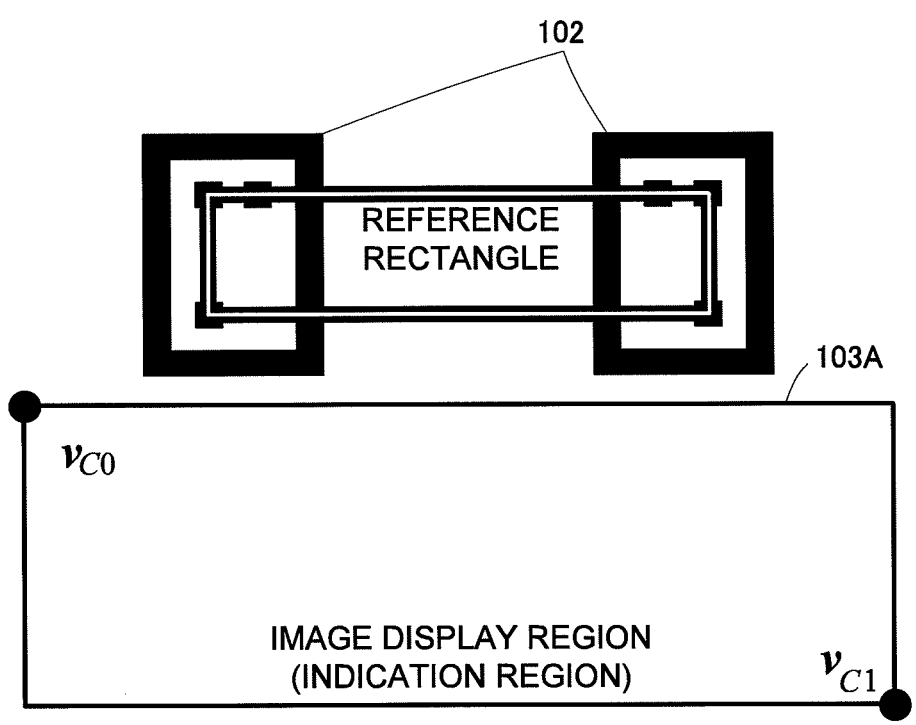
FIG. 16 is an explanatory figure showing a method of normalizing the screen indication region reference for indicated positions in the embodiment shown in FIG. 1.

As shown in FIG. 16, when the horizontal-direction edges of the image display region are parallel to the horizontal-direction edges of the reference rectangle, calibration relating to the image display region is performed by specifying at least two vertices in opposing positions. For example, if the vertices in the upper left and lower right of the image display region in the corrected image coordinate system are respectively $v_{C0}$ and $v_{C1}$, then the arbitrary indicated position $p_C$, renormalized to the indicated position $p_{Cd}$ relative to the image display region, is given by equation (27).

[Equation 27]

$$p_{Cd} = \begin{pmatrix} \frac{(p_C - v_{C0}) \cdot e_{C_x}}{(v_{C1} - v_{C0}) \cdot e_{C_x}} \\ \frac{(p_C - v_{C0}) \cdot e_{C_y}}{(v_{C1} - v_{C0}) \cdot e_{C_y}} \end{pmatrix} \quad (27)$$

Here $e_{C_x}$ and $e_{C_y}$ are unit vectors in the $x_C$ and $y_C$ axis directions respectively of the corrected image coordinate system. The two components of the camera lens position other than the distance component are similarly determined. These vertices $v_{C0}$, $v_{C1}$ are measured by means of calibration.

When the discrimination marks have moved during system operation, the vertices $v_{C0}$, $v_{C1}$ of equation (27) are changed, so that error occurs in the indicated position and other information. In such an even, calibration must be performed once again.

The distance component and rotation angle around the optical axis of the camera lens position are obtained by measuring the $x_i$ of the above equation (14) and $V_i$ of equations (18) and (19), in the initial position and attitude of the gun-type controller 101 which is to be taken as reference in calibration measurements.

Advantageous Results

By means of the embodiment described above, a reference rectangle extracted from simple discrimination marks 102 which employ geometric figures can be used to determine exact solutions for all external parameters of the image capture portion 203. Hence the precision of detection is improved compared with methods in which approximate solutions are determined. More varied and sophisticated game content and application range become possible because there are various external parameters determined, such as the indicated position, relative position, rotation angles, and similar. For example, even when the same target is hit, the points scored and image displayed can be made different depending on the relative position and rotation angle.

In addition to such external parameters, the focal length is an internal parameter which can be determined during operation. Hence other than adjusting the focus of the internal lens of the image capture portion 203, there is no need to perform adjustments during device manufacture which are required to determine external parameters. Consequently, such devices are suited to mass production. Moreover, when there are individual differences between devices, or when the focus is changed during operation, even when a lens is used the focal length of which changes (for example, a variable-focus lens, zoom lens, or similar), the focal length can be updated as appropriate, and detection performed without problems.

The scale of computations required to determine the various parameters desired is small compared with the prior art, and the configuration of computations can be made simple, so that processing loads are light. Further, functions are also implemented for differentiating between disturbing light and discrimination marks 102, so that peripheral illumination environments can be flexibly accommodated. In particular, extraction of discrimination marks 102 may be performed by iterative storage and inspection of each horizontal line of a captured image, so that image storage for one image's worth of data is not necessary, and extraction can be performed using storage space for only several horizontal lines of data, making this embodiment suitable for small-scale embedded equipment.

Discrimination marks 102 need only have identifiable geometric figures, have simple configurations, and are easily installed. Moreover, by adding directionality to the characteristics and method of installation of the geometric figures, the vertical direction and other directions can be identified. By this means, the correct indicated position and other information can be detected without relying on the attitude of the device. And, if the discrimination marks 102 are light-emitting marks, then discrimination is facilitated, but even if reflective marks are used, installation is simple and such a system is suitable for home use.

The light-projection portion 204, image capture portion 203, position information detection portion 202, discrimination mark extraction portion 206, reference rectangle extraction portion 207, and similar are all provided integrally within the gun-type controller 101, so that the overall configuration can be made simple, and the task of connecting devices is also made simple.

Second Embodiment

Summary

This embodiment, while based on the above first embodiment, enables satisfactory inference of the reference rectangle and position detection by means of characteristics described below, even when the desired discrimination mark images cannot be obtained due to rapid motion of the object or the image capture element.

(A) The neighborhood regions of vertices of the reference rectangle, in which discrimination mark positions are to be inferred, are decided using the size of the immediately preceding reference rectangle image.

(B) Thresholds for pixel values which are to be regarded as the background of discrimination mark images are determined from partial images of neighborhood regions in the current image, at the same positions as vertices of the immediately preceding reference rectangle image.

Threshold values may be determined separately for each partial image.

The exposure time and other parameters of the image capture element may be controlled through statistical quantities obtained in the threshold calculation process.

(C) Centroids of grayscale images are determined from partial images in neighborhood regions in the current image at the same positions as the vertices of the immediately preceding reference rectangle image.

Prior to determining centroids, threshold values of pixel values to be regarded as background may be used to remove background light components, in order to improve precision.

Centroids may be calculated using 1-order moments and 0-order moments for each partial image.

Each moment may be determined by dividing a partial image into a plurality of demarcations, and determining the moment for each demarcation.

Among the divided demarcations, only demarcations suitable for centroid calculation may be selected, and centroids calculated.

(D) Vertex positions of the reference rectangle image in the current image are inferred from calculated centroids.

Centroids may be directly taken to be the vertices of the reference rectangle image.

Geometric information, which includes vertices of the immediately preceding reference rectangle image and the discrimination mark image centroids corresponding thereto, may be used to calculate the vertices of the reference rectangle image from centroids determined in the current image.

Configuration

Figure 17:
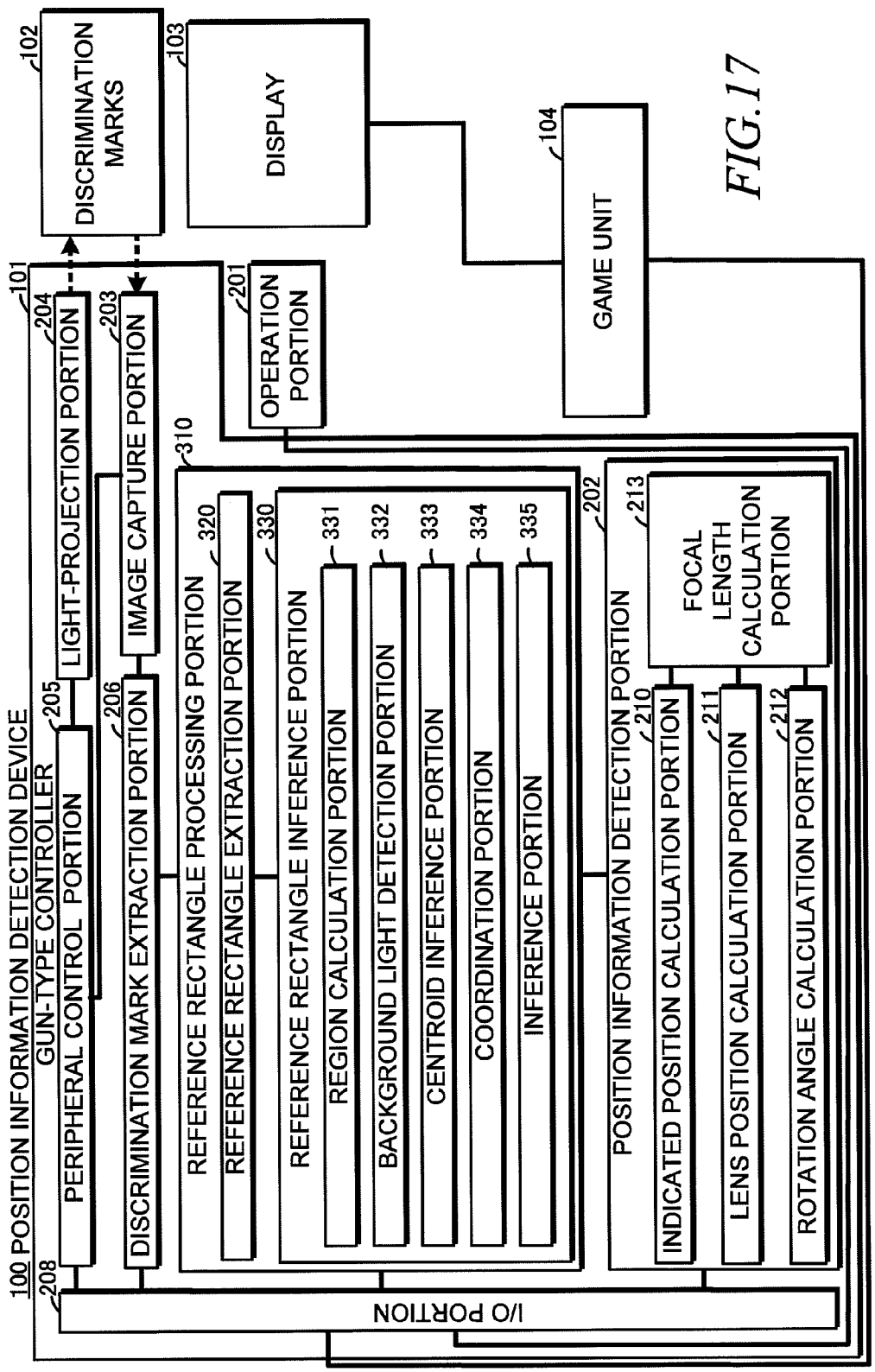
FIG. 17 is a functional block diagram showing a second embodiment of the invention.

Next, the configuration of this embodiment is explained. The basic configuration of this embodiment is similar to that of the above-described first embodiment. However, as shown in FIG. 17, in this embodiment a reference rectangle processing portion 310 is provided. This reference rectangle processing portion 310 has a reference rectangle extraction portion 320 (207 in the first embodiment) which extracts the reference rectangle from the patterns of extracted discrimination marks 102, and a reference rectangle inference portion 330 which, when the reference rectangle cannot be extracted, infers the reference rectangle based on the immediately preceding extracted or inferred reference rectangle and similar.

The reference rectangle inference portion 330 has a region calculation portion 331, which calculates discrimination mark neighborhood regions based on the immediately preceding extracted or inferred reference rectangle; a background light detection portion 332, which detects background light to be blocked; a centroid inference portion 333, which infers the centroids of discrimination marks based on the discrimination mark neighborhood regions and background light; a coordination portion 334, which, based on inferred centroids, makes associations with the vertices of the immediately preceding extracted or inferred reference rectangle; and an inference portion 335, which infers the reference rectangle from the inferred centroids and the results of associations by the coordination portion.

Based on the extracted or inferred reference rectangle, the position information detection portion 202 detects the indicated position in the image display region 103A, the lens position, rotation angle, and other camera (image capture portion 203) external parameters, as well as the focal length and other internal parameters. Details of processing in the reference rectangle processing portion 310 and position information detection portion 202 are as described in the section on Action below.

In this embodiment also, information which is extracted, calculated, and similar in each processing process may be stored in memory or other storage means as appropriate for use in subsequent processing; being commonly performed in the prior art, however, such storage is omitted from the drawings. As storage means, any type of storage means of any capacity may be freely selected. In particular, in the reference rectangle processing in this embodiment, an extracted reference rectangle and inferred reference rectangle are also stored in memory (reference rectangle storage portion), and the immediately preceding extracted reference rectangle or inferred reference rectangle is used in reference rectangle inference processing.

Action

Figure 18:
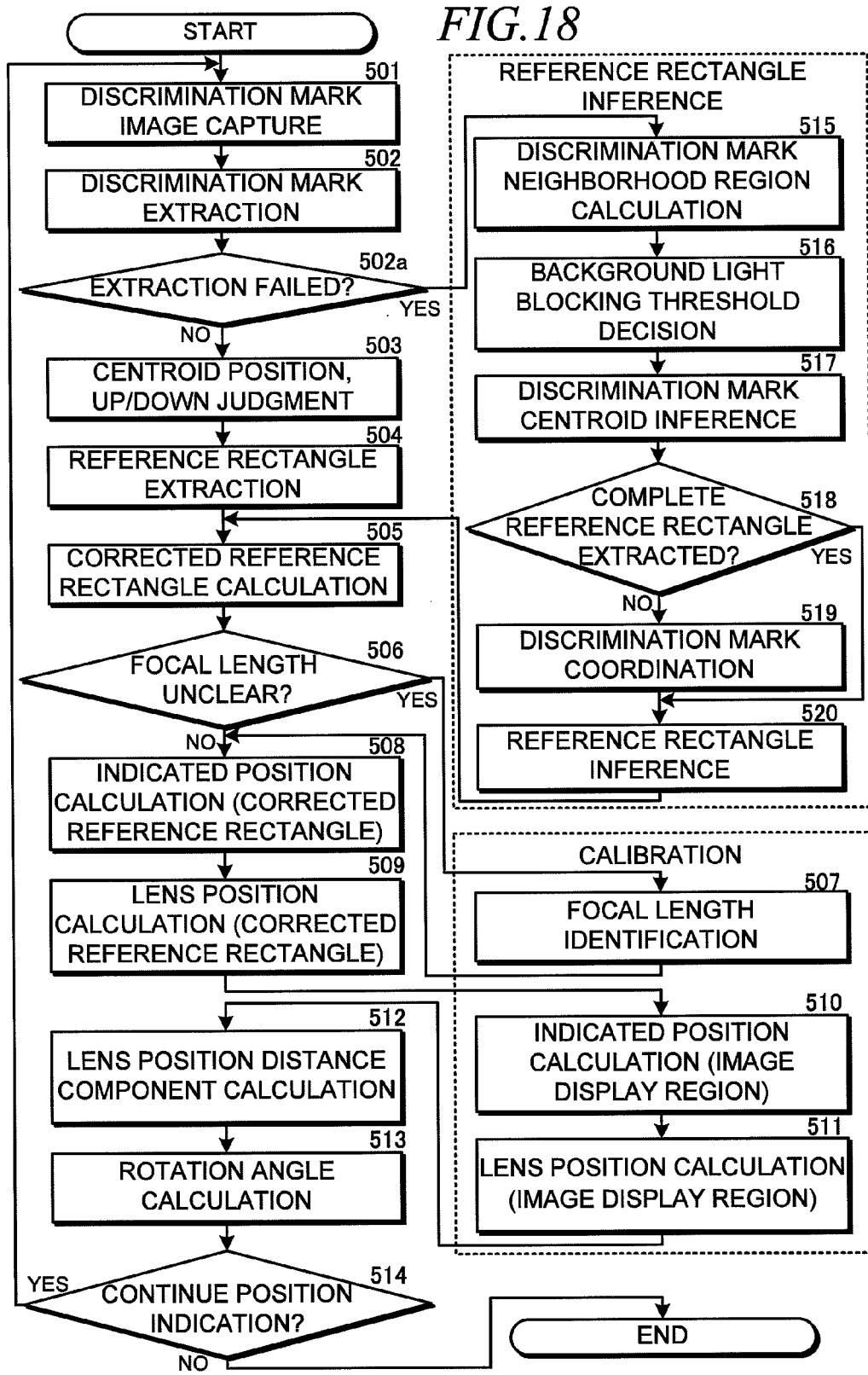
FIG. 18 is a flowchart showing the processing procedure of the embodiment shown in FIG. 17.

The processing of this embodiment as described above is explained referring to the flowchart of FIG. 18 and the explanatory figures of FIG. 19 through FIG. 23. Explanations of processing which is similar to processing in the above-described first embodiment are omitted. The following processing procedure is an example, and the order of processing may be modified so long as the information necessary for each processing stage is obtained in one of the preceding stages.

Reference Rectangle Inference Processing: Steps 515 to 520

In the discrimination mark extraction processing (step 502) of the above-described first embodiment, when discrimination mark extraction fails (step 502a), processing proceeds to reference rectangle inference processing (steps 515 to 520).

That is, in the position information detection portion 202, the external parameters of the camera (image capture portion) such as the indicated position in the image display region and similar, as well as the focal length which is an internal parameter, are detected based on the extracted reference rectangle; but if the discrimination marks which are objects or the camera move comparatively rapidly, the discrimination mark images may be blurred and the shapes and pixel values (amounts of light received) may not be obtained, so that even when an images of discrimination marks are captured, an attempt to extract the reference rectangle ends in failure.

This problem cannot be circumvented given the construction of widely used cameras, but can be resolved by using a camera with a fast shutter speed. However, such cameras are comparatively expensive, and so the separate problem of increased product cost arises.

There is little demand for accurate indicated position detection during such intervals of rapid motion, and even when the position detection error becomes comparatively large, priority is placed on the need for success in indicated position detection.

Hence it is sufficient to enabling inference and extraction of the reference rectangle even during intervals of rapid motion, which pose problems for cameras in wide use. In order to attain this object, in the present embodiment the discrimination mark positions are inferred in the reference rectangle inference portion 330, and then processing is performed to infer vertex positions of the reference rectangle image. This series of reference rectangle inference processing is explained in detail below.

Discrimination Mark Neighborhood region Calculation: Step 515

When reference rectangle extraction has failed (step 502a), prior to inferring the reference rectangle using the captured image, the region calculation portion 331 calculates a region corresponding to the size of the reference rectangle, based on the immediately preceding extracted or inferred reference rectangle (step 515).

Figure 19:
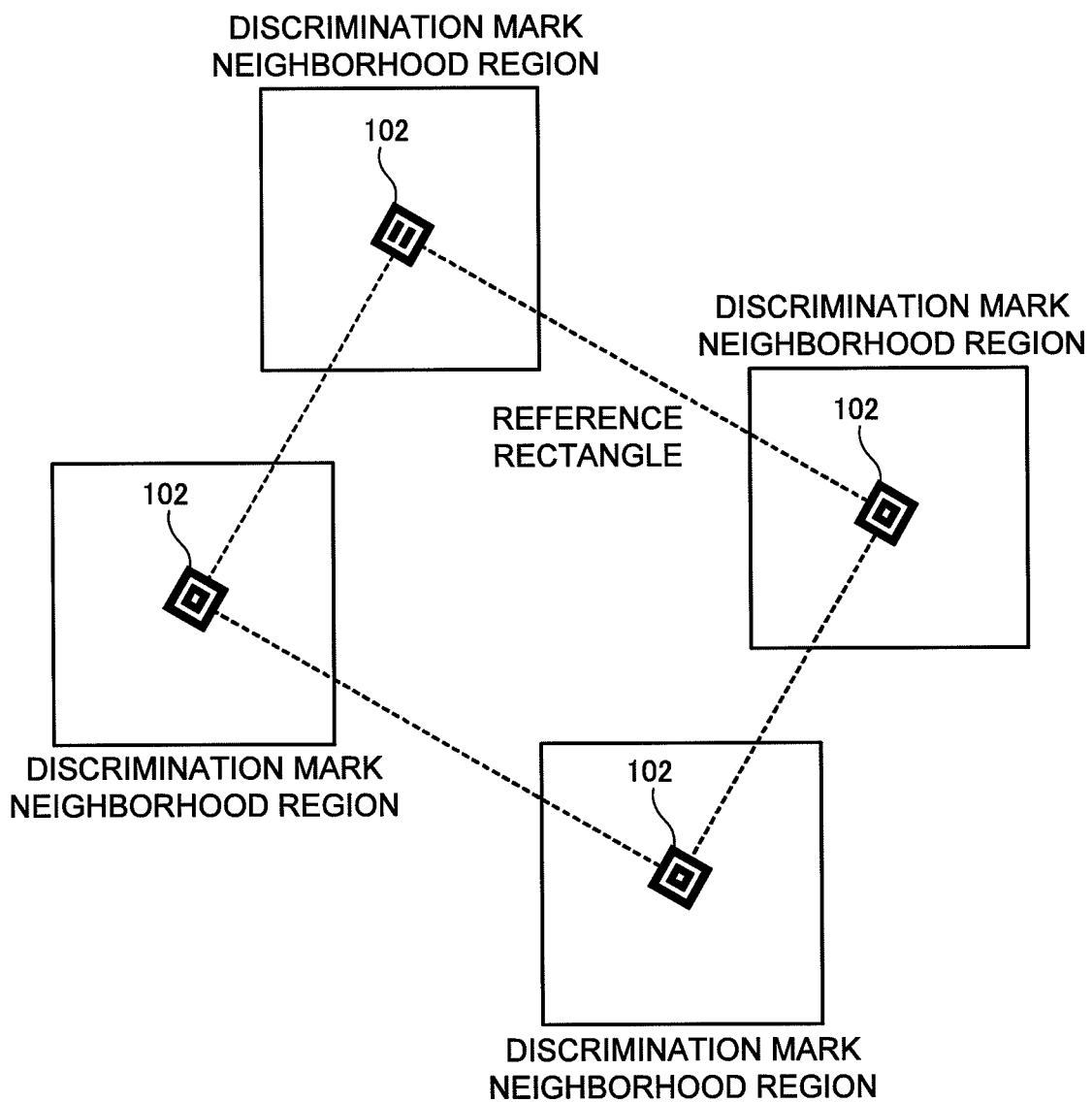
FIG. 19 is an explanatory figure showing an example of neighborhood region calculation, for a case in which there are four discrimination marks in the embodiment of FIG. 17.

The radius of the discrimination mark neighborhood regions may for example be 1/n of an arbitrary edge of the reference rectangle, or may be decided as 1/n of the larger of the difference in the x coordinates or the y coordinates of the endpoints of an arbitrary edge, according to the motion velocity to be allowed. However, as shown in FIG. 19, the decision should be made such that there is no overlapping of neighborhood regions.

Figure 20:
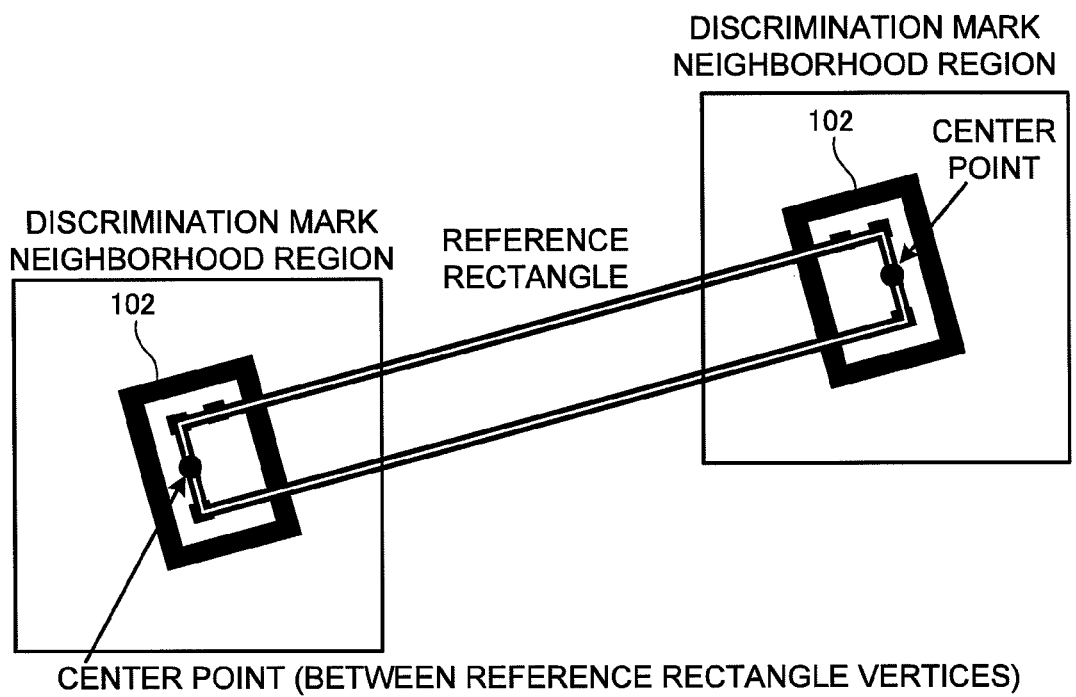
FIG. 20 is an explanatory figure showing an example of neighborhood region calculation, for a case in which there are two discrimination marks in the embodiment of FIG. 17.

The centers of discrimination mark neighborhood regions are taken to be the vertices of the reference rectangle. As shown in FIG. 20, when there are two discrimination marks, the center point of the line segment connecting the reference rectangle vertices of two points belonging to the same discrimination mark is used, so that the number of neighborhood regions is two. In FIG. 19 and FIG. 20, to facilitate the explanation the shapes of the discrimination mark neighborhood regions are square shapes, but the region shape is not limited to a square shape.

Background Light Detection: Step 516

The background light detection portion 332 decides the threshold for pixel values to be regarded as the background of the discrimination mark image (background light blocking threshold) from partial images within the regions corresponding to the discrimination mark neighborhood regions determined immediately before in the current image (step 516).

Figure 21:
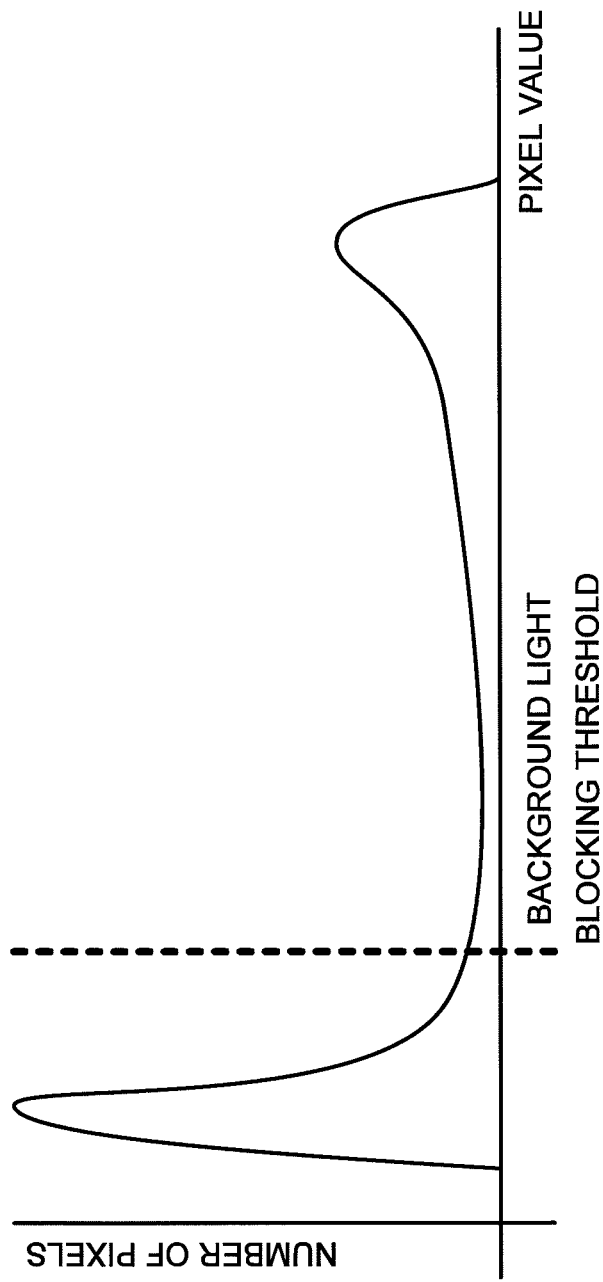
FIG. 21 is an explanatory figure showing an example of background light blocking threshold values in the embodiment of FIG. 17.

When an image of discrimination marks is captured under ideal conditions with little noise, a histogram of the number of pixels in different classes of pixel values in the same partial image should exhibit tendencies approximately such as shown in FIG. 21. Hence a method of performing binary conversion of grayscale images is applied to decide the background light blocking threshold.

A single threshold value can be determined for a plurality of partial images, or threshold values can be determined for each partial image. In the following explanation, threshold values are determined for each partial image.

When a histogram obtained in background light detection processing has characteristics different from those of the histogram in FIG. 21, there is the possibility that image capture was not performed under ideal conditions, and so in order to obtain characteristics similar to those in FIG. 21, the exposure time and other parameters of the image capture element of the image capture portion 203 may be controlled appropriately, or, control information suitable for host equipment external to this system may be provided via the I/O portion 208.

Discrimination Mark Centroid Inference: Step 517

The centroid inference portion 333 uses a partial image within a region corresponding to a discrimination mark neighborhood region determined immediately before in the current image, to total pixel information inferred to be a discrimination mark and determine the centroid of the set of pixels. When the pixel set forms a discrimination mark image, the discrimination mark image centroid can be determined satisfactorily.

In order to improve the precision of the calculated centroid, the background light blocking threshold $I_b^{(k)}$ determined in background light detection processing may be used to convert the partial image $s^{(k)}(i,j)$ of the corresponding discrimination mark neighborhood region k into $t^{(k)}(i,j)$, as in equation (28).

[Equation 28]

$$t^{(k)}(i, j) = \begin{cases} s^{(k)}(i, j) - I_b^{(k)} & (s^{(k)}(i, j) > I_b^{(k)}) \\ 0 & (s^{(k)}(i, j) \leq I_b^{(k)}) \end{cases} \quad (28)$$

In order to compute the centroid of the partial image $s^{(k)}(i,j)$ of the discrimination mark neighborhood region k, the 0-order moment $m_0^{(k)}$, and the 1-order moments in the i and j directions $m_i^{(k)}$, $m_j^{(k)}$, of the image are determined iteratively as in equations (29) through (31). Below, $t^{(k)}(i,j)$ in equation (28) may be substituted for $s^{(k)}(i,j)$.

[Equation 29]

$$m_0^{(k)} = \sum_i \sum_j s^{(k)}(i, j) \quad (29)$$

[Equation 30]

$$m_i^{(k)} = \sum_i \sum_j i s^{(k)}(i, j) \quad (30)$$

[Equation 31]

$$m_j^{(k)} = \sum_i \sum_j j s^{(k)}(i, j) \quad (31)$$

By means of these $m_0^{(k)}$, $m_i^{(k)}$, and $m_j^{(k)}$, the centroid $g^{(k)}$ of the partial image $s^{(k)}(i,j)$ can be determined as in equation (32).

[Equation 32]

$$g^{(k)} = \begin{pmatrix} m_i^{(k)} / m_0^{(k)} \\ m_j^{(k)} / m_0^{(k)} \end{pmatrix} \quad (32)$$

Figure 22:
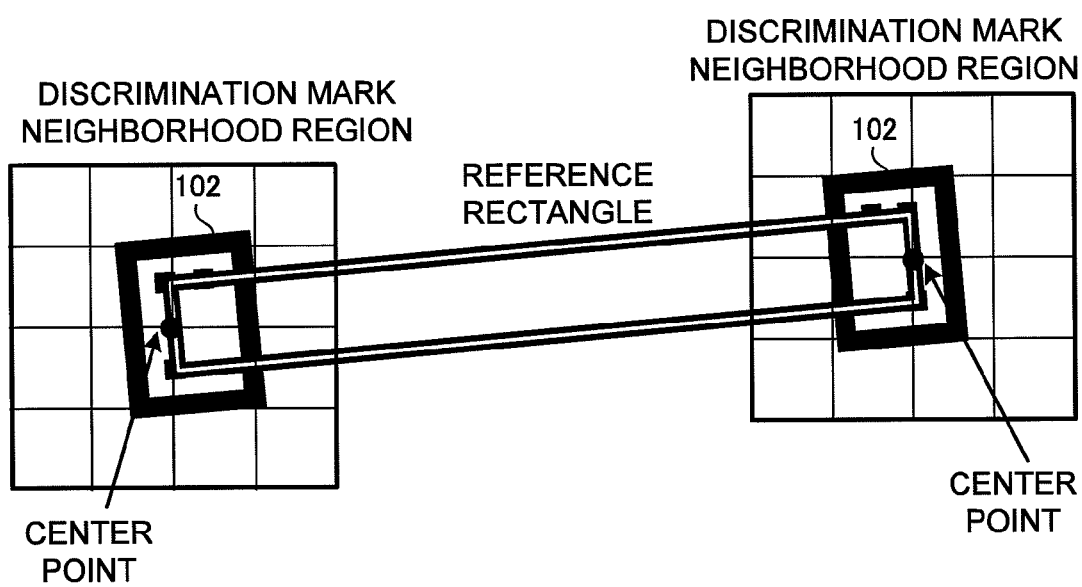
FIG. 22 is an explanatory figure showing an example of discrimination mark centroid inference processing in the embodiment of FIG. 17.

However, when noise components other than the discrimination mark are contained in these partial images to a non-negligible extent, the centroid calculation method of equation (32) may yield an erroneous centroid. Hence as shown in FIG. 22, all discrimination mark neighborhood regions can be similarly divided into a plurality of demarcations, and by selecting only demarcations suitable for centroid calculation, the expected centroids can be determined.

Similarly to equations (29) through (31), the 0-order moments $m_0^{(k,l)}$ and the 1-order moments in the i and j directions $m_i^{(k,l)}$ and $m_j^{(k,l)}$ are determined for each partial image $s^{(k,l)}(i,j)$ in a demarcation of a discrimination mark neighborhood region k.

Figure 23:
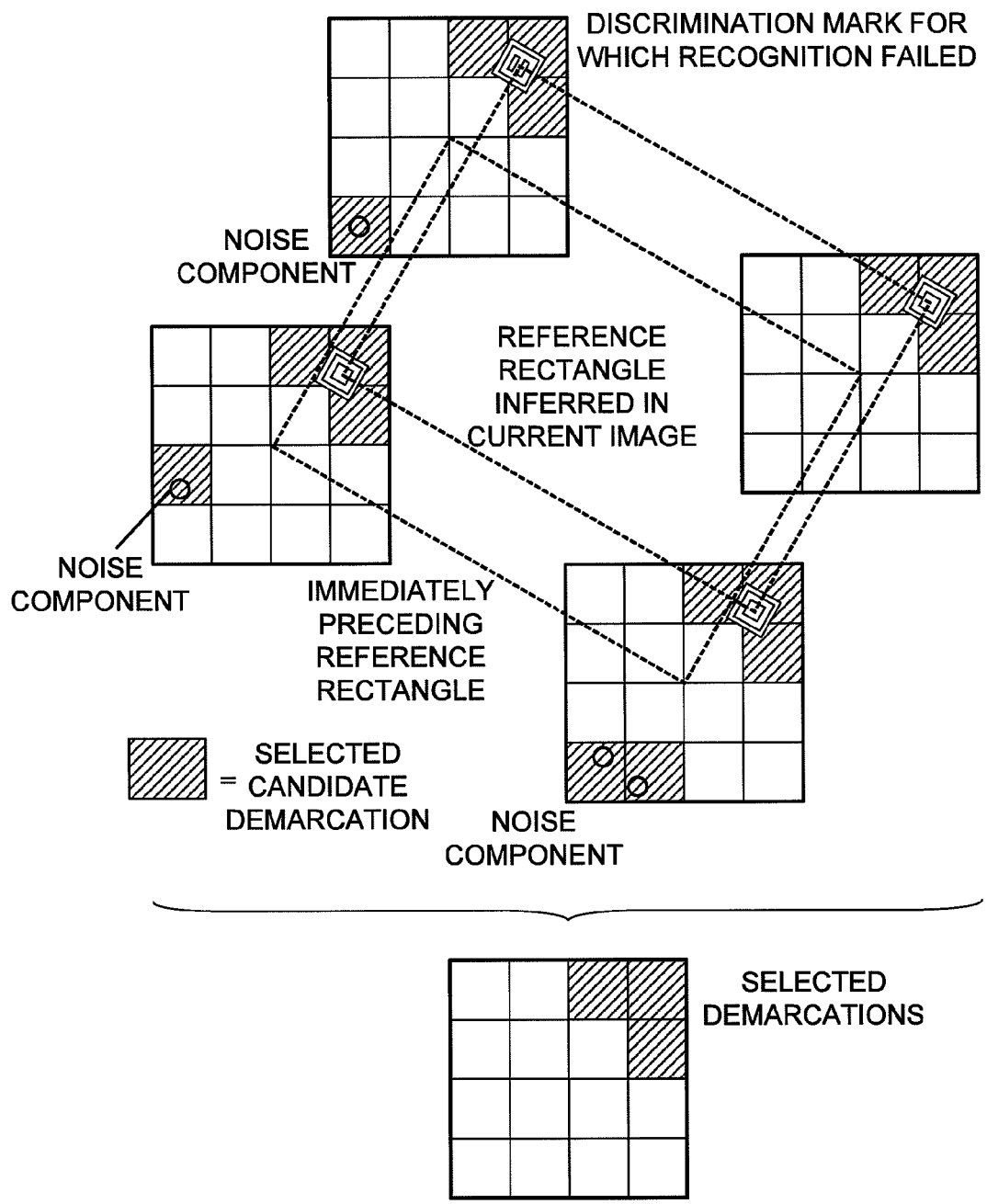
FIG. 23 is an explanatory figure showing an example of demarcation selection processing in the embodiment of FIG. 17.

In order to select demarcations suitable for centroid calculation, for example, demarcations which are selection candidates satisfying fixed conditions between discrimination mark neighborhood regions, as shown in FIG. 23, are considered.

As the condition for making a demarcation l a candidate for selection, when a discrimination mark neighborhood region is divided into n demarcations, for example it may be required that the value of a function $f(m_0^{(k)}, n)$ of the 0-order moment $m_0^{(k)}$ of the discrimination mark neighborhood region k comprising the demarcation l and the number of demarcations n be less than the 0-order moment $m_0^{(k,l)}$ of the demarcation l. This f(m,n) can for example be f=m/an (where a is an arbitrary constant); the function is determined such that demarcations comprising the discrimination mark image in a fixed proportion or higher are selected as candidates.

If all discrimination mark neighborhood regions have moved to a certain extent in the same direction, then as shown in FIG. 23, it can be expected that the same demarcations in a plurality of discrimination mark neighborhood regions comprising at least a fixed proportion of a discrimination mark image will be selected as candidates.

If selection candidate demarcations which match between a plurality of regions in this way are selected, then demarcations comprising noise components can be satisfactorily excluded.

If the sums of the moments of only demarcations selected as described above are $m'_0{}^{(k)}$, $m'_i{}^{(k)}$, and $m'_j{}^{(k)}$, then the centroid $g'^{(k)} = [m'_i{}^{(k)}/m'_0{}^{(k)}, m'_j{}^{(k)}/m'_0{}^{(k)}]^T$ for the partial image $s^{(k)}(i,j)$ is newly obtained.

The reference rectangle inference processing up to this point can be executed in parallel with the discrimination mark extraction processing and other processing.

Discrimination Mark Coordination: Steps 518, 519

The coordination portion 334 attempts to associate each of the vertex positions of the immediately preceding extracted or inferred reference rectangle with the vertex (centroid) positions of the reference rectangle extracted from the current image.

When there are four discrimination marks, if a reference rectangle has been extracted from the current image, then the reference rectangle is output without modification for later-stage processing (step 518). If reference rectangle extraction has failed, but a portion of the reference rectangle vertices have been extracted, then the coordination portion 334 associates these vertices with the closest vertices among the vertices of the immediately preceding extracted or inferred reference rectangle, and outputs only these vertices (step 519). If extraction has failed for all vertices, nothing is output.

When there are two discrimination marks, if the reference rectangle has been extracted from the current image, the reference rectangle is output for later-stage processing without modification (step 518). If reference rectangle extraction has failed, nothing is output.

Reference Rectangle Inference: Step 520

The inference portion 335 infers the reference rectangle in the current image using all of or a portion of the extracted reference rectangle and the centroids $g^{(k)}$ ($g'^{(k)}$) of the partial images $s^{(k)}(i,j)$.

When there are four discrimination marks, if reference rectangle extraction has been successful the result is taken to be the reference rectangle without modification. If only a portion of the reference rectangle vertices have been extracted, or if extraction has failed for all vertices, the centroids $g^{(k)}(g'^{(k)})$ determined from the discrimination mark neighborhood regions k of the vertices for which extraction has failed are inferred to be the vertices in question. These inferred vertices and the successfully extracted vertices are together taken to be the reference rectangle.

When there are two discrimination marks, if reference rectangle extraction has been successful, the reference rectangle vertex inference coefficient matrix $V_i$ of equation (26), determined by the inner product $G = (g^{(1)} - g^{(0)}) \cdot (g^{(1)} - g^{(0)})$ of the difference vector itself between the two centroids thus determined and each of the vertices $v_i$ and centroids $g^{(0)}$ (or $g^{(1)}$) of the reference rectangle, is computed, and is stored (to simplify the notation, $g'^{(k)}$ are omitted).

[Equation 33]

$$V_i = \begin{pmatrix} (v_i g^{(0)}) \cdot (g^{(1)} - g^{(0)}) \\ \det[(v_i - g^{(0)}) \quad (g^{(1)} - g^{(0)})] \end{pmatrix} \tag{33}$$

When reference rectangle extraction has failed, the difference vector $g = g^{(1)} - g^{(0)}$ between the two centroids determined from the current image, and the G and $V_i$ determined immediately before, are used to infer the vertices $v_i$ as in equation (34).

[Equation 34]

$$v_i = \frac{1}{G}\begin{pmatrix} V_i \cdot g \\ \det[V_i \quad g] \end{pmatrix} + g(0) \tag{34}$$

Advantageous Results

By means of the above embodiment, in addition to the advantageous results of the above first embodiment, the following advantageous results are obtained. That is, even when reference rectangle extraction using the current image fails, if extraction or inference of an immediately preceding reference rectangle has been successful, a series of reference rectangle inference processing can be performed to satisfactorily infer the reference rectangle in the current image, and the required indicated position detection results can be obtained.

Further, even when reference rectangle extraction fails due to some other cause, in addition to blurring of the image due to rapid motion of the discrimination marks 102 and image capture portion 203, clearly this function enables satisfactory inference of the reference rectangle, so that the success rate of indicated position detection is improved compared with the prior art. For example, even when recognition of discrimination marks 102 fails due to a temporarily insufficient light quantity, detection of the indicated position is successful. Hence an expensive fast-response type image capture element is not necessarily required, and a widely-used image capture element can be used, so that product cost can be kept low. Further, the range of camera operation can be extended.

Also, background light is blocked, and centroids of discrimination marks 102 are inferred in neighborhood regions of discrimination marks 102 calculated based on the immediately preceding reference rectangle, and by this means the reference rectangle can be inferred; hence the amount of data to be processed is reduced and faster operation is possible, so that satisfactory reference rectangle inference is possible with higher reliability. And, even when there are centroids which cannot be inferred, vertices can be inferred based on the immediately preceding reference rectangle, so that the possibility of obtaining the reference rectangle is increased.

Other Embodiments

This invention is not limited to the above embodiments. The above explanations can easily be reinterpreted as explanations of other embodiments to be attained by the invention. Further, the functional block diagrams of FIG. 2 and FIG. 17 are conceptual diagrams, and various specific circuits are conceivable as means to implement these functions, without being limited to a particular circuit. Moreover, this invention can also be apprehended as a method or program to cause a computer and peripheral circuitry to operate according to the above-described processing. The range over which functions are implemented by hardware processing, and the range over which functions are implemented by software processing, is also freely selectable. As the display, in addition to a CRT or LCD, any current or future display which can be employed may be adopted.

Further, applications of the invention are not limited to shooting-type games. For example, in addition to shooting games, fishing games, fencing games, firefighting-activity games, and other games, as well as, in addition to games, presentation systems, conference systems, television remote controllers, illumination on/off remote controls, blind open/close remote controls, and other remote controls, as well as applications in warehouse and library management systems, and similar are possible. Hence the plane for indication is not limited to a display, but may be a screen, panel, wall, or any other entity.

The invention claimed is:

1. A position information detection device, comprising:
an image capture portion which captures images, by projecting onto an image capture element light-receiving face via a camera lens, of discrimination marks which contains multiple geometric graphics, creates a virtual reference rectangle with vertices of specific points of the multiple geometric graphics and with two diagonals of which lengths are equal, and is arranged on the side of an indication target plane;
a discrimination mark extraction portion which extracts geometric figures from images captured by said image capture portion at an attitude where lengths of two diagonals of a reference rectangle image projected by the image capture element light-receiving face are not equal;
a reference rectangle extraction portion which extracts the reference rectangle image with vertices of specific points in said geometric figures;
a focal length calculation portion which, based on a coordinate system specified by said reference rectangle image, calculates the focal length of the camera lens of said image capture portion with respect to said image capture element light-receiving face; and
an indicated position calculation portion which, based on said coordinate system and said focal length, calculates an indicated position of said image capture portion with respect to said indication target plane.

2. The position information detection device according to claim 1, comprising an image capture portion position calculation portion which, based on said coordinate system and said focal length, calculates the relative position of said image capture portion in a three-dimensional coordinate system set with said indication target plane as reference.

3. The position information detection device according to claim 1, comprising a rotation angle calculation portion which, based on said coordinate system before and after rotation of said image capture portion, calculates the rotation angle of said image capture portion.

4. The position information detection device according to claim 1, wherein that said specific points are the centroids of a plurality of geometric figures provided in said discrimination marks.

5. The position information detection device according to claim 1, wherein that said discrimination marks have a light source, enabling discrimination of said geometric figures from the image captured by said image capture portion.

6. The position information detection device according to claim 1, wherein that each geometric graphic of the reference rectangle is arranged so as to the vertical direction and other directions can be identified.

7. The position information detection device according to claim 1, wherein that said discrimination mark extraction portion extracts geometric figures by performing verification, in the vertical direction, of components which are continuous in the horizontal direction and of components which are not continuous.

8. A position information detection device, comprising:
an image capture portion which captures images, by projecting onto an image capture element light-receiving face via a camera lens, of discrimination marks arranged on the side of an indication target plane;
a discrimination mark extraction portion which extracts geometric figures from images captured by said image capture portion;
a reference rectangle extraction portion which extracts a reference rectangle image with vertices of specific points in said geometric figures;
a reference rectangle storage portion which stores the reference rectangle image extracted by said reference rectangle extraction portion;
a focal length calculation portion which, based on a coordinate system specified by said reference rectangle image, calculates the focal length of the camera lens of said image capture portion with respect to said image capture element light-receiving face;
an indicated position calculation portion which, based on said coordinate system and said focal length, calculates an indicated position of said image capture portion with respect to said indication target plane; and
a reference rectangle inference portion which, when discrimination marks cannot be extracted by said discrimination mark extraction portion, infers a reference rectangle image, by inferring the vertices of the discrimination marks which cannot be extracted, based on the reference rectangle image stored in said reference rectangle storage portion.

9. The position information detection device according to claim 8, wherein that said reference rectangle inference portion has:
a region calculation portion which calculates neighborhood regions of discrimination marks based on the immediately preceding extracted or inferred reference rectangle image stored in said reference rectangle storage portion;
a background light detection portion which detects background light to be blocked in said neighborhood regions;
a centroid inference portion which infers the centroid of discrimination marks in said neighborhood regions based on detection results by said background light detection portion; and
an inference portion which infers a reference rectangle image which includes the centroids as vertices based on the centroid inferred by said centroid inference portion.

10. The position information detection device according to claim 9, comprising a coordination portion which associates the centroid inferred by said centroid inference portion with the reference rectangle image stored in said reference rectangle storage portion, for use in inference by said inference portion.

11. The position information detection device according to claim 8, wherein that said image capture portion has a light-projection portion which irradiates said discrimination marks with light.

12. The position information detection device according to claim 8, wherein that said image capture portion, said discrimination mark extraction portion, said reference rectangle extraction portion, said reference rectangle storage portion, said focal length calculation portion, said indicated position calculation portion, and said reference rectangle inference portion are integrally formed.

13. The position information detection device according to claim 8, comprising an image capture portion position calculation portion which, based on said coordinate system and said focal length, calculates the relative position of said image capture portion in a three-dimensional coordinate system set with said indication target plane as reference.

14. The position information detection device according to claim 8, comprising a rotation angle calculation portion which, based on said coordinate system before and after rotation of said image capture portion, calculates the rotation angle of said image capture portion.

15. The position information detection device according to claim 8, wherein that said specific points are the centroids of a plurality of geometric figures provided in said discrimination marks.

16. The position information detection device according to claim 8, wherein that said discrimination marks have a light source, enabling discrimination of said geometric figures from the image captured by said image capture portion.

17. The position information detection device according to claim 8, wherein that said image capture portion has a light-projection portion which irradiates said discrimination marks with light.

18. A position information detection method, comprising the steps of:
capturing an image, by projecting onto an image capture element light-receiving face via a camera lens, of discrimination marks which contains multiple geometric graphics, creates a virtual reference rectangle with vertices of specific points of the multiple geometric graphics and with two diagonals of which lengths are equal, and is arranged on the side of an indication target plane by means of an image capture portion;
extracting geometric figures from the image captured by the image capture portion at an attitude where lengths of two diagonals of a reference rectangle image projected by the image capture element light-receiving face are not equal, by a discrimination mark extraction portion;
extracting a reference rectangle image with vertices of specific points in said geometric figures, by a reference rectangle extraction portion;
calculating the focal length of the camera lens of said image capture portion with respect to said image capture element light-receiving face, based on a coordinate system specified by said reference rectangle image, by a focal length calculation portion; and
calculating an indicated position of said image capture portion with respect to said indication target plane, based on said coordinate system and said focal length, by an indicated position calculation portion.

19. A position information detection method, comprising the steps of:
capturing an image, by projecting onto an image capture element light-receiving face via a camera lens, of discrimination marks arranged on the side of an indication target plane by an image capture portion;
extracting geometric figures from the image captured by the image capture portion, by a discrimination mark extraction portion;

extracting a reference rectangle image with vertices of specific points in said geometric figures, by a reference rectangle extraction portion;

storing the reference rectangle extracted by said reference rectangle extraction portion, by a reference rectangle storage portion;

calculating the focal length of the camera lens of said image capture portion with respect to said image capture element light-receiving face, based on a coordinate system specified by said reference rectangle image, by a focal length calculation portion;

calculating an indicated position of said image capture portion with respect to said indication target plane, based on said coordinate system and said focal length, by an indicated position calculation portion; and inferring, by a reference rectangle inference portion, the reference rectangle image, by inferring the vertices of the discrimination marks which cannot be extracted, based on the immediately preceding extracted or inferred reference rectangle image stored in said reference rectangle storage portion when the discrimination mark extraction portion cannot extract discrimination marks.

20. A computer-readable non-transitory recording medium having stored therein a position information detection program, executable by a computer connected to an image capture portion, causing:

capture of an image, by projecting onto an image capture element light-receiving face via a camera lens, of discrimination marks which contains multiple geometric graphics, creates a virtual reference rectangle with vertices of specific points of the multiple geometric graphics and with two diagonals of which lengths are equal, and is arranged on the side of an indication target plane by means of the image capture portion;

extraction of geometric figures from the image captured by the image capture portion at an attitude where lengths of two diagonals of a reference rectangle image projected by the image capture element light-receiving face are not equal;

extraction of a reference rectangle image with vertices of specific points in said geometric figures;

calculation of the focal length of the camera lens of said image capture portion with respect to said image capture element light-receiving face, based on a coordinate system specified by said reference rectangle image; and calculation of an indicated position of said image capture portion with respect to said indication target plane, based on said coordinate system and said focal length.

21. A computer-readable non-transitory recording medium having stored therein a position information detection program, executable by a computer connected to an image capture portion, causing:

capture of an image, by projecting onto an image capture element light-receiving face via a camera lens, of discrimination marks arranged on the side of an indication target plane by the image capture portion;

extraction of geometric figures from the image captured by the image capture portion;

extraction of a reference rectangle image with vertices of specific points in said geometric figures;

storage of said reference rectangle image;

calculation of the focal length of the camera lens of said image capture portion with respect to said image capture element light-receiving face, based on a coordinate system specified by said reference rectangle image;

calculation of an indicated position of said image capture portion with respect to said indication target plane, based on said coordinate system and said focal length; and inference of the reference rectangle image, by inferring the vertices of the discrimination marks which cannot be extracted, based on the immediately preceding extracted or inferred stored reference rectangle image when discrimination marks cannot be extracted.

* * * * *